(12) United States Patent
Yang et al.

(10) Patent No.: US 12,082,257 B2
(45) Date of Patent: Sep. 3, 2024

(54) METHOD AND APPARATUS FOR PERFORMING A RANDOM ACCESS PROCEDURE IN WIRELESS COMMUNICATION SYSTEM

(71) Applicant: LG Electronics Inc., Seoul (KR)

(72) Inventors: Suckchel Yang, Seoul (KR); Seonwook Kim, Seoul (KR); Changhwan Park, Seoul (KR); Joonkui Ahn, Seoul (KR); Sukhyon Yoon, Seoul (KR)

(73) Assignee: LG Electronics Inc., Seoul (KR)

( * ) Notice: Subject to any disclaimer, the term of this patent is extended or adjusted under 35 U.S.C. 154(b) by 620 days.

(21) Appl. No.: 17/267,448

(22) PCT Filed: Aug. 9, 2019

(86) PCT No.: PCT/KR2019/010161
§ 371 (c)(1),
(2) Date: Feb. 9, 2021

(87) PCT Pub. No.: WO2020/032742
PCT Pub. Date: Feb. 13, 2020

(65) Prior Publication Data
US 2021/0329703 A1    Oct. 21, 2021

Related U.S. Application Data

(60) Provisional application No. 62/716,952, filed on Aug. 9, 2018.

(30) Foreign Application Priority Data

Sep. 27, 2018    (KR) .......................... 10-2018-0115387

(51) Int. Cl.
*H04W 74/0833*    (2024.01)
*H04B 17/318*    (2015.01)
(Continued)

(52) U.S. Cl.
CPC ...... *H04W 74/0833* (2013.01); *H04B 17/318* (2015.01); *H04L 5/0048* (2013.01); *H04W 24/08* (2013.01); *H04W 72/04* (2013.01)

(58) Field of Classification Search
CPC . H04W 74/0833; H04W 24/08; H04W 72/04; H04W 74/0836; H04B 17/318; H04L 5/0048; H04L 5/001; H04L 5/0053
See application file for complete search history.

(56) References Cited

U.S. PATENT DOCUMENTS 11,375,546 B2 *    6/2022   Suzuki ............. H04W 74/0808
2018/0205516 A1 *   7/2018   Jung ..................... H04L 5/0007
(Continued)

FOREIGN PATENT DOCUMENTS

WO    WO2017155324    9/2017

OTHER PUBLICATIONS

LG Electronics, "RACH procedure," R1-1806606, 3GPP TSG RAN WG1 Meeting #93, Busan, Korea, dated May 21-25, 2018, 8 pages.
(Continued)

*Primary Examiner* — Gary Mui
*Assistant Examiner* — Yewon Kim
(74) *Attorney, Agent, or Firm* — Fish & Richardson P.C.

(57) ABSTRACT

The present invention relates to a wireless communication system and, in particular, to a method and an apparatus therefor, the method comprising the steps of: transmitting a random access request message including RAP transmission and PUSCH transmission, wherein the PUSCH transmission is transmitted using a resource related to the RAP transmission, and includes a C-RNTI; and in order to receive a response to the random access request message, monitoring a PDCCH in a time window, wherein a first PDCCH, accompanied by a TA command, is detected in the time window, and when the first PDCCH is indicated by the C-RNTI, a step of receiving the response to the random access request message is terminated.

18 Claims, 17 Drawing Sheets

(51) Int. Cl.
*H04L 5/00* (2006.01)
*H04W 24/08* (2009.01)
*H04W 72/04* (2023.01)

(56) References Cited

U.S. PATENT DOCUMENTS

2021/0014903 A1* 1/2021 Zhang .................. H04W 76/30
2021/0329704 A1* 10/2021 Yang .................... H04W 72/23

OTHER PUBLICATIONS

Oppo, "Random access procedure for NR-U," R2-1809922, 3GPP TSG-RAN WG2 Meeting #AH 1807, Montreal, Canada, dated Jul. 2-6, 2018, 5 pages.
PCT International Search Report in Written Opinion in International Appln. No. PCT/KR2019/010161, dated Nov. 27, 2019, 16 pages (with English translation).
Samsung Electronics, "Corrections for random access backoff," R2-1809471, 3GPP TSG-RAN2 Adhoc, Montreal, Canada, dated Jul. 2-6, 2018, 8 pages.
Zte, "Remaining details of RACH procedure," R1-1805945, 3GPP TSG RAN WG1 Meeting #93, Busan, Korea, dated May 21-25, 2018, 17 pages.

* cited by examiner (a) Carrier aggregation between L-band and U-band (b) standalone U-band(s)

METHOD AND APPARATUS FOR PERFORMING A RANDOM ACCESS PROCEDURE IN WIRELESS COMMUNICATION SYSTEM

CROSS-REFERENCE TO RELATED APPLICATIONS

This application is a National Stage application under 35 U.S.C. § 371 of International Application No. PCT/KR2019/010161, filed on Aug. 9, 2019, which claims the benefit of Korean Application No. 10-2018-0115387, filed on Sep. 27, 2018, and U.S. Provisional Application No. 62/716,952, filed on Aug. 9, 2018. The disclosures of the prior applications are incorporated by reference in their entirety.

TECHNICAL FIELD

The present invention relates to a wireless communication system, and more particularly, to a method and apparatus for transmitting/receiving a wireless signal.

BACKGROUND ART

Generally, a wireless communication system is developing to diversely cover a wide range to provide such a communication service as an audio communication service, a data communication service and the like. The wireless communication is a sort of a multiple access system capable of supporting communications with multiple users by sharing available system resources (e.g., bandwidth, transmit power, etc.). For example, the multiple access system may include one of CDMA (code division multiple access) system, FDMA (frequency division multiple access) system, TDMA (time division multiple access) system, OFDMA (orthogonal frequency division multiple access) system, SC-FDMA (single carrier frequency division multiple access) system and the like.

DETAILED DESCRIPTION OF THE DISCLOSURE

Technical Problems

An object of the present invention is to provide a method of efficiently transmitting/receiving control information in a wireless communication and an apparatus therefor.

Technical tasks obtainable from the present invention are non-limited the above-mentioned technical task. And, other unmentioned technical tasks can be clearly understood from the following description by those having ordinary skill in the technical field to which the present invention.

Technical Solutions

According to an aspect of the present disclosure, provided herein is a method of transmitting a signal by a communication apparatus in a wireless communication system, including: transmitting a random access request message including random access preamble (RAP) transmission and physical uplink shared channel (PUSCH) transmission, the PUSCH transmission being performed using a resource related to the RAP transmission and including a cell-radio network temporary identifier (C-RNTI); and monitoring a physical downlink control channel (PDCCH) in a time window to receive a response to the random access request message, wherein reception of the response to the random access request message is ended based on detection of a first PDCCH with a timing advance (TA) command in the time window and on indication of the first PDCCH by the C-RNTI.

In another aspect of the present disclosure, provided herein is a communication apparatus used in a wireless communication system, including a memory; and a processor, wherein the processor is configured to transmit a random access request message including random access preamble (RAP) transmission and physical uplink shared channel (PUSCH) transmission, the PUSCH transmission being performed using a resource related to the RAP transmission and including a cell-radio network temporary identifier (C-RNTI), and monitor a physical downlink control channel (PDCCH) in a time window to receive a response to the random access request message, and wherein reception of the response to the random access request message is ended based on detection of a first PDCCH with a timing advance (TA) command in the time window and on indication of the first PDCCH by the C-RNTI.

Reception of the response to the random access request message may include monitoring a PDCCH indicated by a random access-RNTI (RA-RNTI) in the time window.

The TA command may be included in the first PDCCH or in a physical downlink shared channel (PDSCH) related to the first PDCCH.

The RAP transmission may be performed in one random access channel (RACH) occasion (RO) among a plurality of ROs, and each of the ROs may be related to one or more PUSCH resources.

The RO may include a time-frequency resource used for the RAP transmission, and the PUSCH resources may include at least one of a PUSCH time-frequency resource, a PUSCH scrambling identity (ID), or a PUSCH demodulation reference signal (DMRS) resource.

The random access request message may be transmitted in a radio resource control (RRC) connection state.

The wireless communication system may include a 3rd generation partnership project (3GPP)-based wireless communication system.

The communication apparatus may include at least a user equipment, a network, or a self-driving vehicle communicable with other self-driving vehicles other than the communication device.

The communication apparatus may include a radio frequency (RF) unit.

Advantageous Effects

According to the present invention, wireless signal transmission and reception can be efficiently performed in a wireless communication system.

Effects obtainable from the present invention may be non-limited by the above mentioned effect. And, other unmentioned effects can be clearly understood from the following description by those having ordinary skill in the technical field to which the present invention pertains.

BRIEF DESCRIPTION OF DRAWINGS

The accompanying drawings, which are included to provide a further understanding of the disclosure and are incorporated in and constitute a part of this application, illustrate embodiments of the disclosure and together with the description serve to explain the principle of the disclosure. In the drawings.

BEST MODE FOR CARRYING OUT THE DISCLOSURE

Embodiments of the present disclosure are applicable to a variety of wireless access technologies such as code division multiple access (CDMA), frequency division multiple access (FDMA), time division multiple access (TDMA), orthogonal frequency division multiple access (OFDMA), and single carrier frequency division multiple access (SC-FDMA). CDMA can be implemented as a radio technology such as Universal Terrestrial Radio Access (UTRA) or CDMA2000. TDMA can be implemented as a radio technology such as Global System for Mobile communications (GSM)/General Packet Radio Service (GPRS)/Enhanced Data Rates for GSM Evolution (EDGE). OFDMA can be implemented as a radio technology such as Institute of Electrical and Electronics Engineers (IEEE) 802.11 (Wireless Fidelity (Wi-Fi)), IEEE 802.16 (Worldwide interoperability for Microwave Access (WiMAX)), IEEE 802.20, and Evolved UTRA (E-UTRA). UTRA is a part of Universal Mobile Telecommunications System (UMTS). 3rd Generation Partnership Project (3GPP) Long Term Evolution (LTE) is part of Evolved UMTS (E-UMTS) using E-UTRA, and LTE-Advanced (A) is an evolved version of 3GPP LTE. 3GPP NR (New Radio or New Radio Access Technology) is an evolved version of 3GPP LTE/LTE-A.

As more and more communication devices require a larger communication capacity, there is a need for mobile broadband communication enhanced over conventional radio access technology (RAT). In addition, massive Machine Type Communications (MTC) capable of providing a variety of services anywhere and anytime by connecting multiple devices and objects is another important issue to be considered for next generation communications. Communication system design considering services/UEs sensitive to reliability and latency is also under discussion. As such, introduction of new radio access technology considering enhanced mobile broadband communication (eMBB), massive MTC, and Ultra-Reliable and Low Latency Communication (URLLC) is being discussed. In the present disclosure, for simplicity, this technology will be referred to as NR (New Radio or New RAT).

For the sake of clarity, 3GPP NR is mainly described, but the technical idea of the present disclosure is not limited thereto.

In a wireless communication system, a user equipment (UE) receives information through downlink (DL) from a base station (BS) and transmit information to the BS through uplink (UL). The information transmitted and received by the BS and the UE includes data and various control information and includes various physical channels according to type/usage of the information transmitted and received by the UE and the BS.

Figure 1:
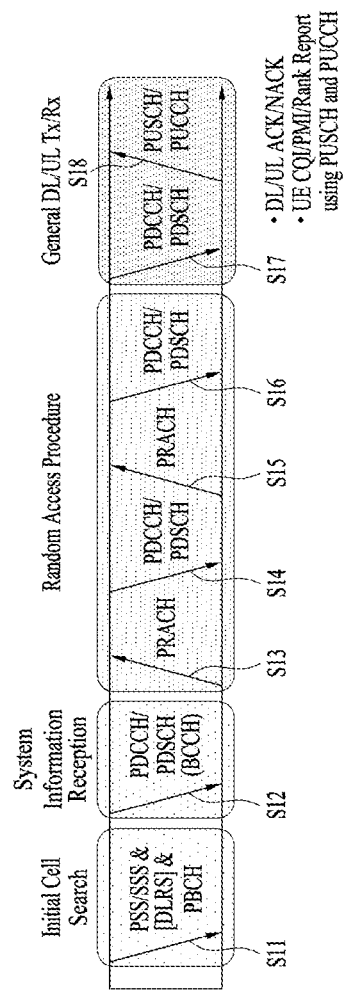
FIG. 1 illustrates physical channels used in a 3rd generation partnership project (3GPP) system, which is an example of wireless communication systems, and a general signal transmission method using the same.

FIG. 1 illustrates physical channels used in a 3GPP NR system and a general signal transmission method using the same.

When a UE is powered on again from a power-off state or enters a new cell, the UE performs an initial cell search procedure, such as establishment of synchronization with a BS, in step S101. To this end, the UE receives a synchronization signal block (SSB) from the BS. The SSB includes a primary synchronization signal (PSS), a secondary synchronization signal (SSS), and a physical broadcast channel (PBCH). The UE establishes synchronization with the BS based on the PSS/SSS and acquires information such as a cell identity (ID). The UE may acquire broadcast information in a cell based on the PBCH. The UE may receive a DL reference signal (RS) in an initial cell search procedure to monitor a DL channel status.

After initial cell search, the UE may acquire more specific system information by receiving a physical downlink control channel (PDCCH) and receiving a physical downlink shared channel (PDSCH) based on information of the PDCCH in step S102.

The UE may perform a random access procedure to access the BS in steps S103 to S106. For random access, the UE may transmit a preamble to the BS on a physical random access channel (PRACH) (S103) and receive a response message for preamble on a PDCCH and a PDSCH corresponding to the PDCCH (S104). In the case of contention-based random access, the UE may perform a contention resolution procedure by further transmitting the PRACH (S105) and receiving a PDCCH and a PDSCH corresponding to the PDCCH (S106).

After the foregoing procedure, the UE may receive a PDCCH/PDSCH (S107) and transmit a physical uplink shared channel (PUSCH)/physical uplink control channel (PUCCH) (S108), as a general downlink/uplink signal transmission procedure. Control information transmitted from the UE to the BS is referred to as uplink control information (UCI). The UCI includes hybrid automatic repeat and request acknowledgement/negative-acknowledgement (HARQ-ACK/NACK), scheduling request (SR), channel state information (CSI), etc. The CSI includes a channel quality indicator (CQI), a precoding matrix indicator (PMI), a rank indicator (RI), etc. While the UCI is transmitted on a PUCCH in general, the UCI may be transmitted on a PUSCH when control information and traffic data need to be simultaneously transmitted. In addition, the UCI may be aperiodically transmitted through a PUSCH according to request/command of a network.

Figure 2:
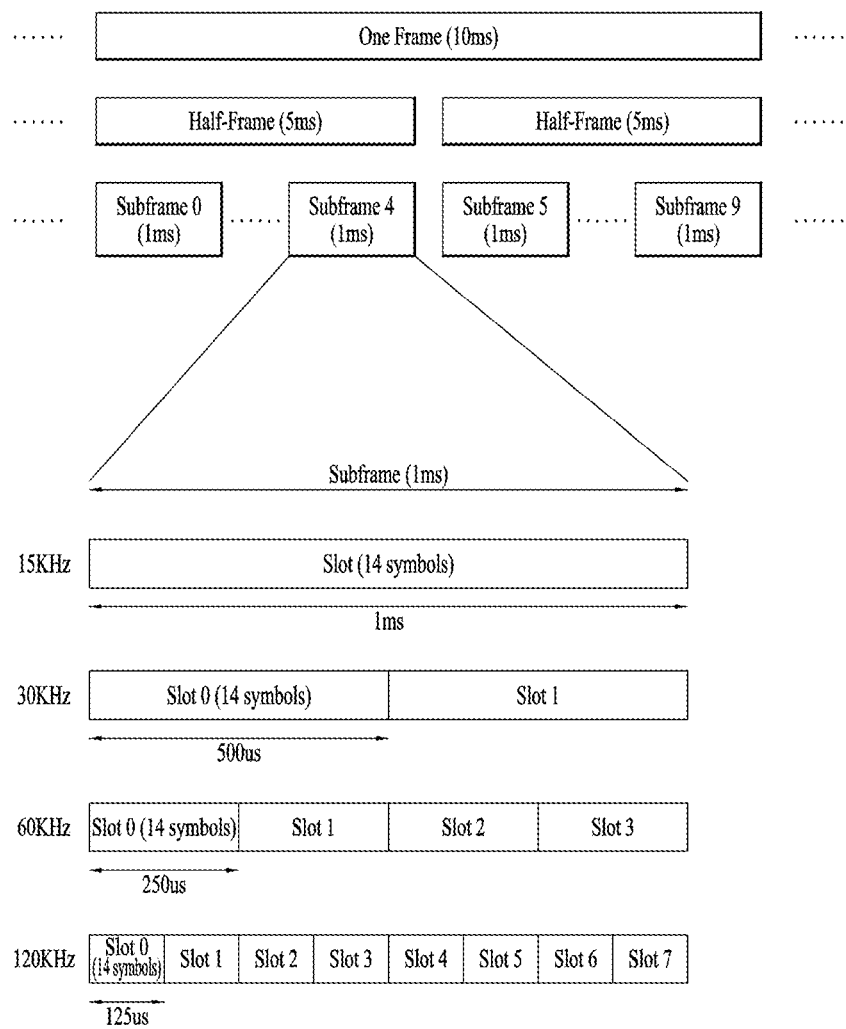
FIG. 2 illustrates a radio frame structure.

FIG. 2 illustrates a radio frame structure. In NR, uplink and downlink transmissions are configured with frames. Each radio frame has a length of 10 ms and is divided into two 5-ms half-frames (HF). Each half-frame is divided into five 1-ms subframes (SFs). A subframe is divided into one or more slots, and the number of slots in a subframe depends on subcarrier spacing (SCS). Each slot includes 12 or 14 Orthogonal Frequency Division Multiplexing (OFDM) symbols according to a cyclic prefix (CP). When a normal CP is used, each slot includes 14 OFDM symbols. When an extended CP is used, each slot includes 12 OFDM symbols.

Table 1 exemplarily shows that the number of symbols per slot, the number of slots per frame, and the number of slots per subframe vary according to the SCS when the normal CP is used.

TABLE 1

| SCS (15 * 2^u) | $N_{symb}^{slot}$ | $N_{slot}^{frame,u}$ | $N_{slot}^{subframe,u}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

* $N_{symb}^{slot}$: Number of symbols in a slot
* $N_{slot}^{frame,u}$: Number of slots in a frame
* $N_{slot}^{subframe,u}$: Number of slots in a subframe Table 2 illustrates that the number of symbols per slot, the number of slots per frame, and the number of slots per subframe vary according to the SCS when the extended CP is used.

TABLE 2

| SCS (15 * 2^u) | $N_{symb}^{slot}$ | $N_{slot}^{frame,u}$ | $N_{slot}^{subframe,u}$ |
|---|---|---|---|
| 60 KHz (u = 2) | 12 | 40 | 4 |

The structure of the frame is merely an example. The number of subframes, the number of slots, and the number of symbols in a frame may vary.

In the NR system, OFDM numerology (e.g., SCS) may be configured differently for a plurality of cells aggregated for one UE. Accordingly, the (absolute time) duration of a time resource (e.g., an SF, a slot or a TTI) (for simplicity, referred to as a time unit (TU)) consisting of the same number of symbols may be configured differently among the aggregated cells. Here, the symbols may include an OFDM symbol (or a CP-OFDM symbol) and an SC-FDMA symbol (or a discrete Fourier transform-spread-OFDM (DFT-s-OFDM) symbol).

Figure 3:
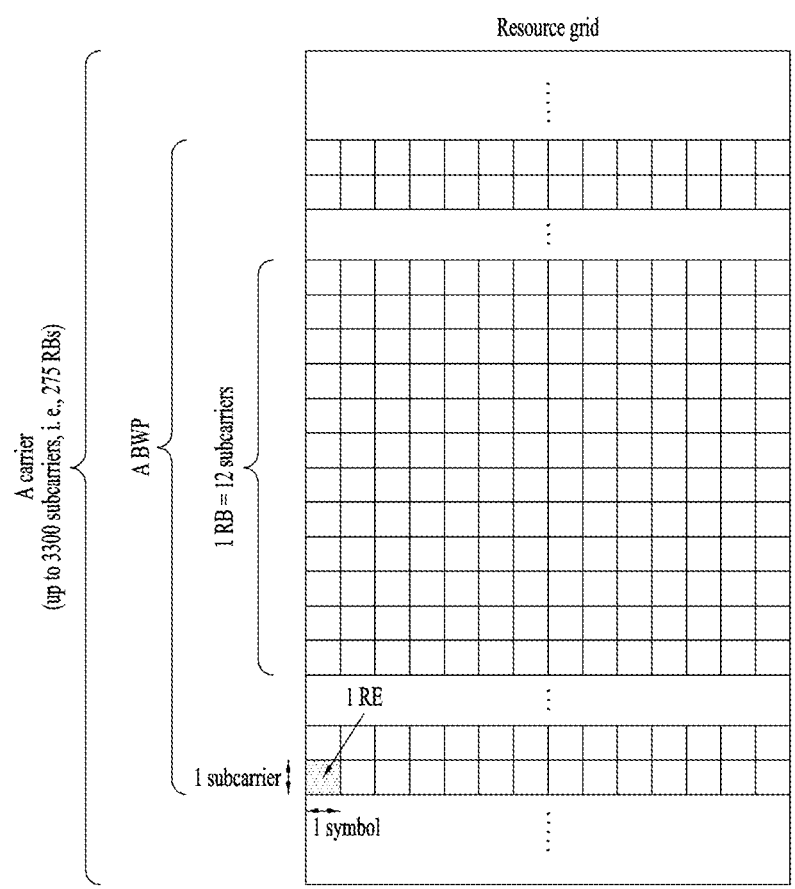
FIG. 3 illustrates a resource grid of a slot.

FIG. 3 illustrates a resource grid of a slot. A slot includes a plurality of symbols in the time domain. For example, when the normal CP is used, the slot includes 14 symbols. However, when the extended CP is used, the slot includes 12 symbols. A carrier includes a plurality of subcarriers in the frequency domain. A resource block (RB) is defined as a plurality of consecutive subcarriers (e.g., 12 consecutive subcarriers) in the frequency domain. A bandwidth part (BWP) may be defined to be a plurality of consecutive physical RBs (PRBs) in the frequency domain and correspond to a single numerology (e.g., SCS, CP length, etc.). The carrier may include up to N (e.g., 5) BWPs. Data communication may be performed through an activated BWP, and only one BWP may be activated for one UE. In the resource grid, each element is referred to as a resource element (RE), and one complex symbol may be mapped to each RE.

Figure 4:
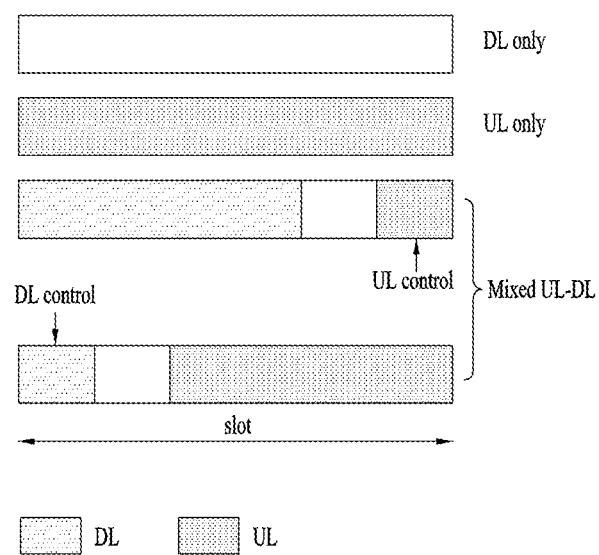
FIG. 4 illustrates a structure of a self-contained slot.

FIG. 4 illustrates a structure of a self-contained slot. In the NR system, a frame has a self-contained structure in which a DL control channel, DL or UL data, a UL control channel, and the like may all be included in one slot. For example, the first N symbols (hereinafter referred to as a DL control region) in a slot may be used to transmit a DL control channel, and the last M symbols (hereinafter referred to as a UL control region) in the slot may be used to transmit a UL control channel. N and M are integers greater than 0. A resource region between the DL control region and the UL control region (hereinafter referred to as a data region) may be used for DL data transmission or UL data transmission. There may be a time gap for DL-to-UL or UL-to-DL switching between the control region and the data region. For example, the following configurations may be considered. Corresponding intervals are listed in temporal order.

1. DL only configuration
2. UL only configuration
3. Mixed UL-DL configuration
   DL region+Guard Period (GP)+UL control region;
   DL control region+GP+UL region,
   DL region: (i) DL data region or (ii) DL control region+DL data region;
   UL region: (i) UL data region or (ii) UL data region+ UL control region.

Figure 5:
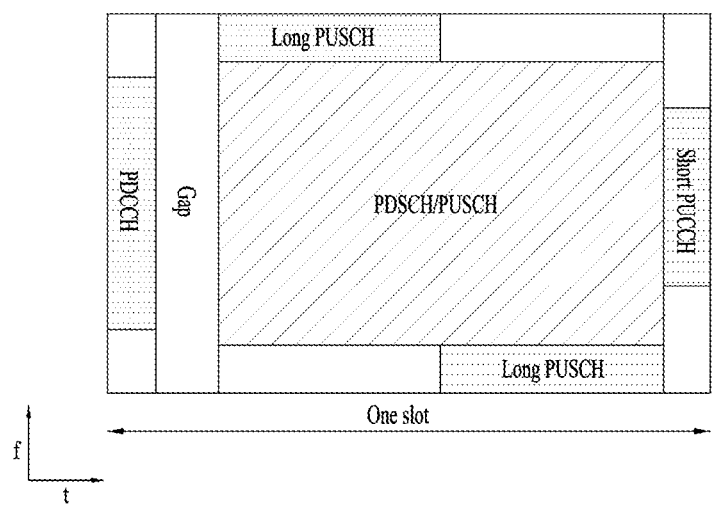
FIG. 5 illustrates an example in which a physical channel is mapped to a self-contained slot.

FIG. 5 illustrates an example in which a physical channel is mapped into a self-contained slot. A PDCCH may be transmitted in the DL control region, and a PDSCH may be transmitted in the DL data region. A PUCCH may be transmitted in the UL control region, and a PUSCH may be transmitted in the UL data region. The GP provides a time gap in the process of switching from the transmission mode to the reception mode or from the reception mode to the transmission mode. Some symbols at the time of switching from DL to UL within a subframe may be configured as the GP.

Hereinafter, each of the physical channels will be described in more detail.

The PDCCH carries Downlink Control Information (DCI). For example, the PCCCH (i.e., DCI) carries a transmission format and resource allocation of a downlink shared channel (DL-SCH), resource allocation information about an uplink shared channel (UL-SCH), paging information about a paging channel (PCH), system information present on the DL-SCH, resource allocation information about a higher layer control message such as a random access response transmitted on a PDSCH, a transmit power control command, and activation/release of configured scheduling (CS). The DCI includes a cyclic redundancy check (CRC). The CRC is masked/scrambled with different identifiers (e.g., Radio Network Temporary Identifier (RNTI)) according to the owner or usage of the PDCCH. For example, if the PDCCH is for a specific UE, the CRC will be masked with a UE identifier (e.g., Cell-RNTI (C-RNTI)). If the PDCCH is for paging, the CRC will be masked with a Paging-RNTI (P-RNTI). If the PDCCH is for system information (e.g., a system information block (SIB)), the CRC will be masked with an system information RNTI (SI-RNTI). If the PDCCH is for a random access response, the CRC will be masked with a random access-RNTI (RA-RNTI).

The PDCCH consists of 1, 2, 4, 8, or 16 Control Channel Elements (CCEs) depending on an aggregation level (AL). The CCE is a logical allocation unit used to provide a PDCCH having a predetermined code rate according to a radio channel state. A CCE consists of 6 Resource Element Groups (REGs). An REG is defined by one OFDM symbol and one (P)RB. The PDCCH is transmitted through a Control Resource Set (CORESET). The CORESET is defined as an REG set having a given numerology (e.g., SCS, CP length). A plurality of CORESETs for one UE may overlap with each other in the time/frequency domain. A CORESET may be configured through system information (e.g., a Master Information Block (MIB)) or UE-specific higher layer (e.g. Radio Resource Control (RRC) layer) signaling. Specifically, the number of RBs and the number of OFDM symbols (a maximum of 3 OFDM symbols) that constitute the CORESET may be configured by higher layer signaling.

To receive/detect a PDCCH, the UE monitors PDCCH candidates. The PDCCH candidates represent the CCE(s) that the UE should monitor for PDCCH detection. Each PDCCH candidate is defined as 1, 2, 4, 8, or 16 CCEs depending on the AL. The monitoring includes (blind) decoding of the PDCCH candidates. A set of PDCCH candidates monitored by the UE is defined as a PDCCH Search Space (SS). The SS includes a common search space (CSS) or a UE-specific search space (USS). The UE may acquire DCI by monitoring the PDCCH candidates in one or more SSs configured by the MIB or higher layer signaling. Each CORESET is associated with one or more SSs, and each of the SSs is associated with one COREST. The SSs may be defined based on the following parameters.

controlResourceSetId: Indicates a CORESET associated with an SS;

monitoringSlotPeriodicityAndOffset: Indicates a PDCCH monitoring periodicity (in units of slots) and a PDCCH monitoring interval offset (in units of slots);

monitoringSymbolsWithinSlot: Indicates PDCCH monitoring symbols in a slot (e.g. the first symbol(s) of the CORESET);

nrofCandidates: Indicates the number of PDCCH candidates (one of 0, 1, 2, 3, 4, 5, 6, and 8) for each AL={1, 2, 4, 8, 16}.

An occasion (e.g., time/frequency resources) in which PDCCH candidates should be monitored is defined as a PDCCH (monitoring) occasion. One or more PDCCH (monitoring) occasions may be configured in a slot.

Table 3 exemplarily shows the features of the respective search space types.

TABLE 3

| Type | Search Space | RNTI | Use Case |
| --- | --- | --- | --- |
| Type0-PDCCH | Common | SI-RNTI on a primary cell | SIB Decoding |
| Type0A-PDCCH | Common | SI-RNTI on a primary cell | SIB Decoding |
| Type1-PDCCH | Common | RA-RNTI or TC-RNTI on a primary cell | Msg2, Msg4 decoding in RACH |
| Type2-PDCCH | Common | P-RNTI on a primary cell | Paging Decoding |
| Type3-PDCCH | Common | INT-RNTI, SFI-RNTI, TPC-PUSCH-RNTI, TPC-PUCCH-RNTI, TPC-SRS-RNTI, C-RNTI, MCS-C-RNTI, or CS-RNTI(s) | |
| | UE Specific | C-RNTI, or MCS-C-RNTI, or CS-RNTI(s) | User specific PDSCH decoding |

Table 4 exemplarily shows DCI formats transmitted on the PDCCH.

TABLE 4

| DCI format | Usage |
| --- | --- |
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |
| 2_0 | Notifying a group of UEs of the slot format |

TABLE 4-continued

| DCI format | Usage |
| --- | --- |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |

DCI format 0_0 may be used for scheduling of a TB-based (or TB-level) PUSCH, and DCI format 0_1 may be used for scheduling of a TB-based (or TB-level) PUSCH or a Code Block Group (CBG)-based (or CBG-level) PUSCH. DCI format 1_0 may be used for scheduling of a TB-based (or TB-level) PDSCH, and DCI format 1_1 may be used for scheduling of a TB-based (or TB-level) PDSCH or a CBG-based (or CBG-level) PDSCH (DL grant DCI). DCI format 0_0/0_1 may be referred to as UL grant DCI or UL scheduling information, and DCI format 1_0/1_1 may be referred to as DL grant DCI or UL scheduling information. DCI format 2_0 is used to deliver dynamic slot format information (e.g., dynamic SFI) to the UE, and DCI format 2_1 is used to deliver downlink pre-emption information to the UE. DCI format 2_0 and/or DCI format 2_1 may be delivered to UEs in a group on a group common PDCCH, which is a PDCCH delivered to UEs defined as one group.

DCI format 0_0 and DCI format 1_0 may be referred to as fallback DCI formats, and DCI format 0_1 and DCI format 1_1 may be referred to as non-fallback DCI formats. For the fallback DCI formats, the same DCI size/field configuration is maintained regardless of the UE configuration. On the other hand, for the non-fallback DCI formats, the DCI size/field configuration varies according to the UE configuration.

The PDSCH carries downlink data (e.g., DL-SCH transport block (DL-SCH TB)), and a modulation technique such as Quadrature Phase Shift Keying (QPSK), 16 Quadrature Amplitude Modulation (QAM), 64 QAM, or 256 QAM is applied thereto. The TB is encoded to generate a codeword. The PDSCH may carry a maximum of two codewords. Scrambling and modulation mapping may be performed on each codeword, and the modulation symbols generated from each codeword may be mapped to one or more layers. Each of the layers is mapped to a resource together with a Demodulation Reference Signal (DMRS) to generate an OFDM symbol signal and transmit the signal through a corresponding antenna port.

The PUCCH carries Uplink Control Information (UCI). The UCI includes the following information.

Scheduling Request (SR): Information that is used to request a UL-SCH resource.

Hybrid Automatic Repeat Request (HARQ)-Acknowledgment (ACK): A response to a downlink data packet (e.g., codeword) on the PDSCH. HARQ-ACK indicates whether the downlink data packet has been successfully received. In response to a single codeword, one bit of HARQ-ACK may be transmitted. In response to two codewords, two bits of HARQ-ACK may be transmitted. The HARQ-ACK response includes positive ACK (simply, ACK), negative ACK (NACK), DTX or NACK/DTX. Here, the HARQ-ACK is used interchangeably used with HARQ ACK/NACK and ACK/NACK.

Channel State Information (CSI): Feedback information about a downlink channel. Multiple Input Multiple Output (MIMO)-related feedback information includes a Rank Indicator (RI) and a Precoding Matrix Indicator (PMI).

Table 5 exemplarily shows PUCCH formats. PUCCH formats may be divided into Short PUCCHs (Formats 0 and 2) and Long PUCCHs (Formats 1, 3, and 4) based on the PUCCH transmission duration.

TABLE 5

| PUCCH format | Length in OFDM symbols $N_{symb}^{PUCCH}$ | Number of bits | Usage | Etc |
|---|---|---|---|---|
| 0 | 1-2 | ≤2 | HARQ, SR | Sequence selection |
| 1 | 4-14 | ≤2 | HARQ, [SR] | Sequence modulation |
| 2 | 1-2 | >2 | HARQ, CSI, [SR] | CP-OFDM |
| 3 | 4-14 | >2 | HARQ, CSI, [SR] | DFT-s-OFDM (no UE multiplexing) |
| 4 | 4-14 | >2 | HARQ, CSI, [SR] | DFT-s-OFDM (Pre DFT OCC) |

PUCCH format 0 carries UCI having a size of up to 2 bits, and is mapped based on a sequence and transmitted. Specifically, a UE transmits one of a plurality of sequences on a PUCCH corresponding to PUCCH format 0 to transmit specific UCI to the eNB. Only when transmitting a positive SR, the UE transmits a PUCCH corresponding to PUCCH format 0 within a PUCCH resource for the corresponding SR configuration.

PUCCH format 1 carries UCI having a size of up to 2 bits, and the modulation symbols therefor are spread by an orthogonal cover code (OCC) (configured differently depending on whether frequency hopping is performed) in the time domain. The DMRS is transmitted on a symbol on which a modulation symbol is not transmitted (namely, the DMRS is transmitted through time division multiplexing (TDM)).

PUCCH format 2 carries UCI having a bit size larger than 2 bits, and the modulation symbols are transmitted through frequency division multiplexing (FDM) with the DMRS. The DM-RS is positioned on symbol indexes #1, #4, #7 and #10 in a resource block given with a density of ⅓. A Pseudo Noise (PN) sequence is used for the DM_RS sequence. For two-symbol PUCCH format 2, frequency hopping may be enabled.

PUCCH format 3 is not subjected to UE multiplexing in the same physical resource block, but carries UCI having a bit size larger than 2 bits. In other words, the PUCCH resource of PUCCH format 3 does not include an OCC. The modulation symbols are transmitted through time division multiplexing (TDM) with the DMRS.

PUCCH format 4 supports multiplexing with up to 4 UEs in the same physical resource blocks and carries UCI having a bit size larger than 2 bits. In other words, the PUCCH resource of PUCCH format 3 includes an OCC. The modulation symbols are transmitted through time division multiplexing (TDM) with the DMRS.

The PUSCH carries uplink data (e.g., UL-SCH transport block (UL-SCH TB)) and/or uplink control information (UCI), and is transmitted based on a Cyclic Prefix-Orthogonal Frequency Division Multiplexing (CP-OFDM) waveform or a Discrete Fourier Transform-spread-Orthogonal Frequency Division Multiplexing (DFT-s-OFDM) waveform. When the PUSCH is transmitted based on the DFT-s-OFDM waveform, the UE applies transform precoding to transmit the PUSCH. For example, when the transform precoding is not allowed (e.g., the transform precoding is disabled), the UE may transmit the PUSCH based on the CP-OFDM waveform. When the transform precoding is allowed (e.g., the transform precoding is enabled), the UE may transmit the PUSCH based on the CD-OFDM waveform or the DFT-s-OFDM waveform. PUSCH transmission may be dynamically scheduled by the UL grant in the DCI or semi-statically scheduled based on higher layer (e.g., RRC) signaling (and/or Layer 1 (L1) signaling (e.g., PDCCH)) (configured grant). The PUSCH transmission may be performed on a codebook basis or on a non-codebook basis.

Figure 6:
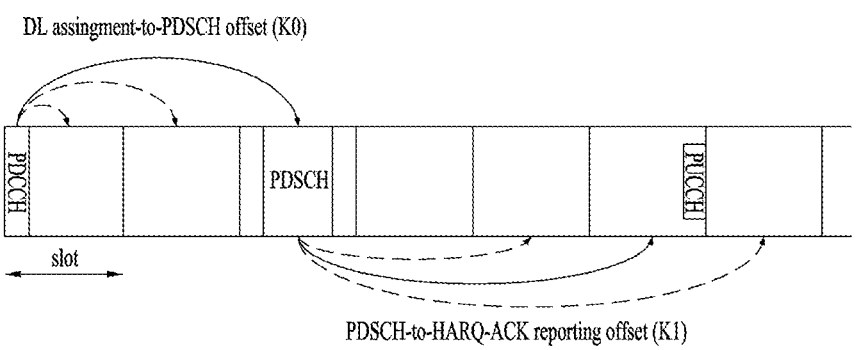
FIG. 6 illustrates an acknowledgement/negative acknowledgement (ACK/NACK) transmission procedure.

FIG. 6 illustrates an ACK/NACK transmission procedure. Referring to FIG. 6, the UE may detect a PDCCH in slot #n. Here, the PDCCH includes downlink scheduling information (e.g., DCI format 1_0 or 1_1). The PDCCH indicates a DL assignment-to-PDSCH offset (K0) and a PDSCH-HARQ-ACK reporting offset (K1). For example, DCI format 1_0 or 1_1 may include the following information.

Frequency domain resource assignment: Indicates an RB set assigned to the PDSCH.

Time domain resource assignment: Indicates K0 and the starting position (e.g. OFDM symbol index) and duration (e.g. the number of OFDM symbols) of the PDSCH in a slot.

PDSCH-to-HARQ_feedback timing indicator: Indicates K1.

After receiving the PDSCH in slot #(n+K0) according to the scheduling information of slot #n, the UE may transmit UCI on the PUCCH in slot #(n+K1). Here, the UCI includes a HARQ-ACK response to the PDSCH. In the case where the PDSCH is configured to transmit a maximum of one TB, the HARQ-ACK response may be configured in one bit. In the case where the PDSCH is configured to transmit a maximum of two TBs, the HARQ-ACK response may be configured in two bits if spatial bundling is not configured and may be configured in one bit if spatial bundling is configured. When slot #(n+K1) is designated as a HARQ-ACK transmission time for a plurality of PDSCHs, the UCI transmitted in slot #(n+K1) includes a HARQ-ACK response to the plurality of PDSCHs.

Figure 7:
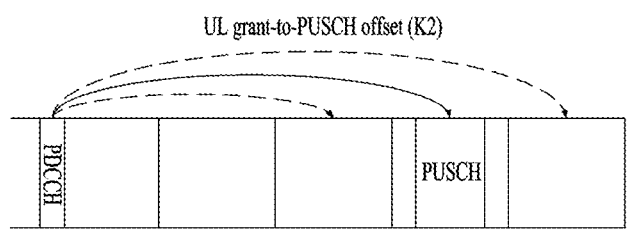
FIG. 7 illustrates an exemplary physical uplink shared channel (PUSCH) transmission procedure.

FIG. 7 illustrates an exemplary PUSCH transmission procedure. Referring to FIG. 7, a UE may detect a PDCCH in slot #n. The PDCCH may include UL scheduling information (e.g., DCI format 0_0, DCI format 0_1). DCI format 0_0 and DCI format 0_1 may include the following information.

Frequency domain resource assignment: this indicates an RB set allocated to a PUSCH.

Time domain resource assignment: this specifies a slot offset K2 indicating the starting position (e.g., symbol index) and length (e.g., the number of OFDM symbols) of the PUSCH in a slot. The starting symbol and length of the PUSCH may be indicated by a start and length indicator value (SLIV), or separately.

The UE may then transmit the PUSCH in slot #(n+K2) according to the scheduling information in slot #n. The PUSCH includes a UL-SCH TB.

Figure 8:
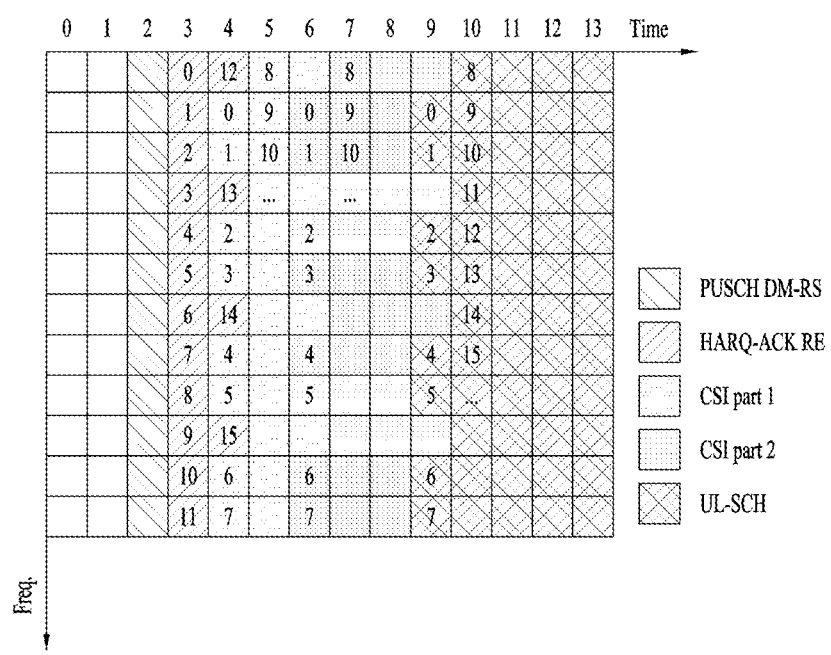
FIG. 8 illustrates exemplary multiplexing control information in a PUSCH.

FIG. 8 illustrates exemplary multiplexing of UCI in a PUSCH. If a plurality of PUCCH resources overlap with a PUSCH resource in a slot and a PUCCH-PUSCH simultaneous transmission is not configured in the slot, UCI may be transmitted on a PUSCH (UCI piggyback or PUSCH piggyback), as illustrated. In the illustrated case of FIG. 8, an HARQ-ACK and CSI are carried in a PUSCH resource.

Recently, standardization of a 5G wireless communication system called new RAT (NR) is underway in 3GPP standardization organizations. The 3GPP NR system supports a plurality of logical networks in a single physical system and is designed to support services (e.g., eMBB, mMTC, and/or URLLC) having various requirements by changing a transmission time interval (TTI) and/or an OFDM numerology (e.g., an OFDM symbol duration and/or a subcarrier spacing (SPS)). With recent emergence of smart devices, data traffic has rapidly increased. Therefore, even the 3GPP NR system considers using an unlicensed band for cellular communication similar to licensed-assisted access (LAA) of a legacy 3GPP LTE system. However, unlike LAA, an NR cell in an unlicensed band (hereinafter, NR UCell) aims to support a standalone (SA) operation. As an example, PUCCH and/or PUSCH transmission may be supported in the NR UCell.

Figure 9:
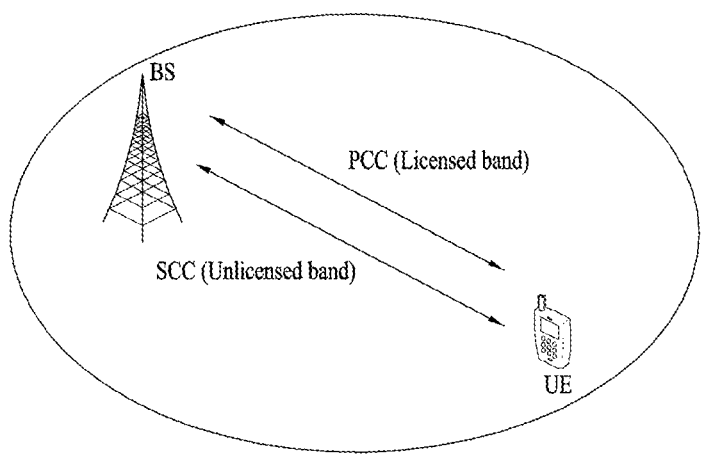
FIG. 9 illustrates a wireless communication system supporting an unlicensed band.
Figure 9:
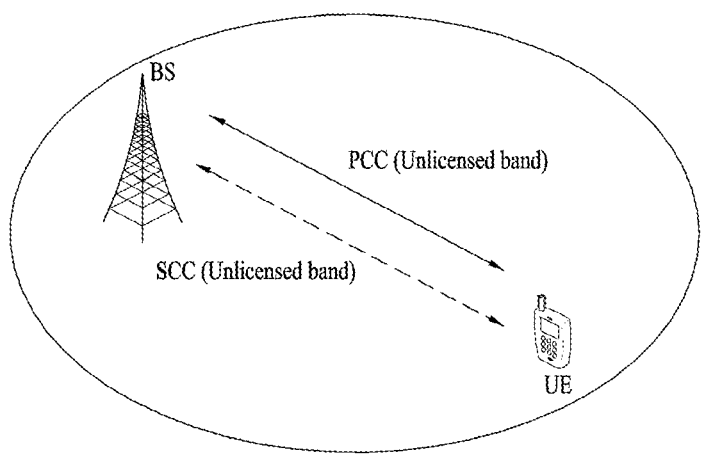

FIG. 9 illustrates a wireless communication system supporting an unlicensed band. For convenience, a cell operating in a licensed band (hereinafter, L-band) is defined as an LCell and a carrier of the LCell is defined as a (DL/UL) LCC. A cell operating in an unlicensed band (hereinafter, U-band) is defined as a UCell and a carrier of the UCell is defined as a (DL/UL) UCC. A carrier of a cell may represent an operating frequency (e.g., a center frequency) of the cell. A cell/carrier (e.g., CC) may generically be referred to as a cell.

When carrier aggregation is supported, one UE may transmit and receive signals to and from a BS in a plurality of aggregated cells/carriers. If a plurality of CCs is configured for one UE, one CC may be configured as a primary CC (PCC) and the other CCs may be configured as secondary CCs (SCCs). Specific control information/channels (e.g., a CSS PDCCH and PUCCH) may be configured to transmit and receive signals only in the PCC. Data may be transmitted and received in the PCC and/or the SCCs. In FIG. 9(a), the UE and the BS transmit and receive signals in the LCC and the UCC (non-standalone (NSA) mode). In this case, the LCC may be configured as the PCC and the UCC may be configured as the SCC. If a plurality of LCCs is configured for the UE, one specific LCC may be configured as the PCC and the other LCCs may be configured as the SCCs. FIG. 9(a) corresponds to LAA of the 3GPP LTE system. FIG. 9(b) illustrates the case in which the UE and the BS transmit and receive signals in one or more UCCs without the LCC (SA mode). In this case, one of the UCCs may be configured as the PCC and the other UCCs may be configured as the SCCs. Both the NSA mode and the SA mode may be supported in an unlicensed band of the 3GPP NR system.

Figure 10:
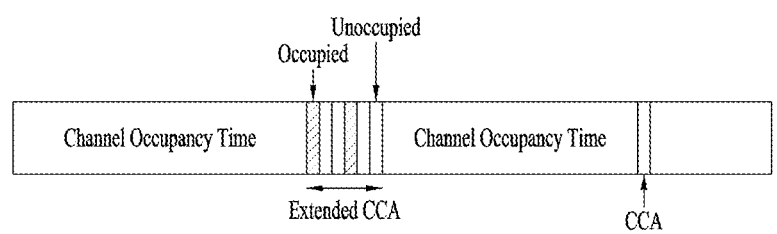
FIG. 10 illustrates a method of occupying resources in an unlicensed band.

FIG. 10 illustrates a method of occupying resources in an unlicensed band. According to regional regulations concerning the unlicensed band, a communication node in the unlicensed band needs to determine, before signal transmission, whether other communication nodes use a channel. Specifically, the communication node may first perform carrier sensing (CS) before signal transmission to check whether other communication nodes transmit signals. If it is determined that other communication nodes do not transmit signals, this means that clear channel assessment (CCA) is confirmed. When there is a predefined CCA threshold or a CCA threshold configured by higher layer (e.g., RRC) signaling, if energy higher than the CCA threshold is detected in a channel, the communication node may determine that the channel is in a busy state and, otherwise, the communication node may determine that the channel is in an idle state. For reference, in Wi-Fi standard (802.11ac), the CCA threshold is set to −62 dBm for a non-Wi-Fi signal and to −82 dBm for a Wi-Fi signal. Upon determining that the channel is in an idle state, the communication node may start to transmit signals in the UCell. The above processes may be referred to as listen-before-talk (LBT) or a channel access procedure (CAP). LBT and CAP may be used interchangeably.

Embodiment: 2—Step RACH

To support an (initial) random access operation of the UE, the NR system (including the legacy LTE system) defines a 4-step RACH procedure including 1) transmission of PRACH preamble (Msg1) from the UE to the BS, 2) transmission of a random access response (RAR) (Msg2) from the BS to the UE, 3) transmission of Msg3 from the UE to the BS, and 4) transmission of Msg4 (for contention resolution) from the BS to the UE.

Figure 11:
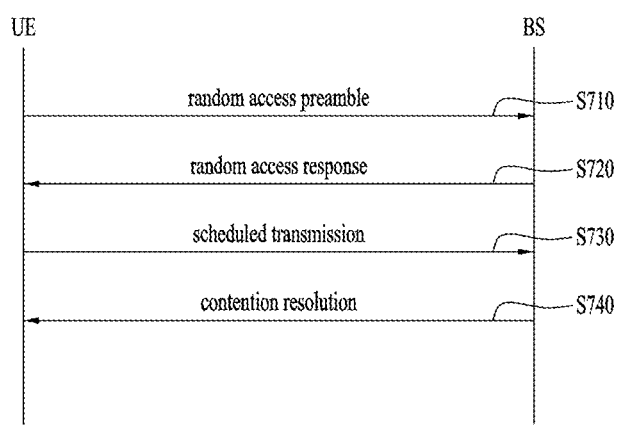
FIG. 11 illustrates a random access channel (RACH) procedure.

FIG. 11 illustrates a conventional 4-step RACH procedure. Signals/information transmitted in each step and a detailed operation performed in each step will be described below with reference to FIG. 11.

1) Msg1 (PRACH): Msg1 is transmitted from the UE to the BS (S710). Msg1 may be distinguished with a time/frequency resource (RACH occasion (RO)), on which a random access (RA) preamble is transmitted, and an RA preamble index (RAPID).

2) Msg2 (RAR PDSCH): Msg2 is a response message to Msg1 and is transmitted from the BS to the UE (S720). To receive Msg2, the UE may monitor a PDCCH to check whether there is an RA-RNTI-based PDCCH (e.g., CRC of a PDCCH is masked with an RA-RNTI) in a time window related to Msg1 (hereinafter, an RAR window). Upon receiving the PDCCH masked with the RA-RNTI, the UE may receive the RAR on a PDSCH indicated by the RA-RNTI PDCCH. The RA-RNTI may be determined as follows.

$$\text{RA-RNTI}=1+s\_id+14 \times t\_id+14*80*f\_id+14*80*8*ul\_carrier\_id \quad \text{[Equation 1]}$$

where s_id denotes an index of the first OFDM symbol of a PRACH (e.g., 0 to 13), t_id denotes an index of the first slot of the PRACH in a frame (e.g., 0 to 79), f_id denotes a frequency resource index of the PRACH (e.g., 0 to 7), and ul_carrier_id denotes a UL carrier (type) used for PRACH transmission (e.g., 0 or 1) (e.g., 0 for a normal uplink (NUL) carrier and 1 for a supplementary uplink (SUL) carrier). s_id corresponds to a beam and t_id/f_id corresponds to a time-frequency resource (e.g., RO) used for PRACH transmission.

3) Msg3 (PUSCH): Msg3 is transmitted from the UE to the BS (S730). Msg3 is transmitted based on a UL grant in an RAR. Msg3 may include a contention resolution ID (and/or buffer state report (BSR) information and/or RRC connection request). Retransmission based on a HARQ process may be applied to Msg3 (PUSCH). Here, the contention resolution ID includes a UL common control channel (CCCH) service data unit (SDU). When the UL CCCH SDU is greater than 48 bits, only the first 48 bits of the UL CCCH SDU may be included in Msg3.

4) Msg4 (PDSCH): Msg4 is transmitted from the BS to the UE (S740). Msg4 may include a UE (global) ID for contention resolution (and/or RRC connection related information). Whether contention resolution has been successful or has failed may be determined based on Msg4.

When Msg2/Msg4 is not successfully received, the UE retransmits Msg1. In this case, the UE increases transmit power of Msg1 (power ramping) and increases an RACH retransmission counter value. If the RACH retransmission counter value reaches a maximum value, it is determined that an RACH procedure has completely failed. In this case, the UE may perform random back-off and then initialize an RACH related parameter (e.g., the RACH retransmission counter). Thus, the UE may newly initialize the RACH procedure.

Figure 12:
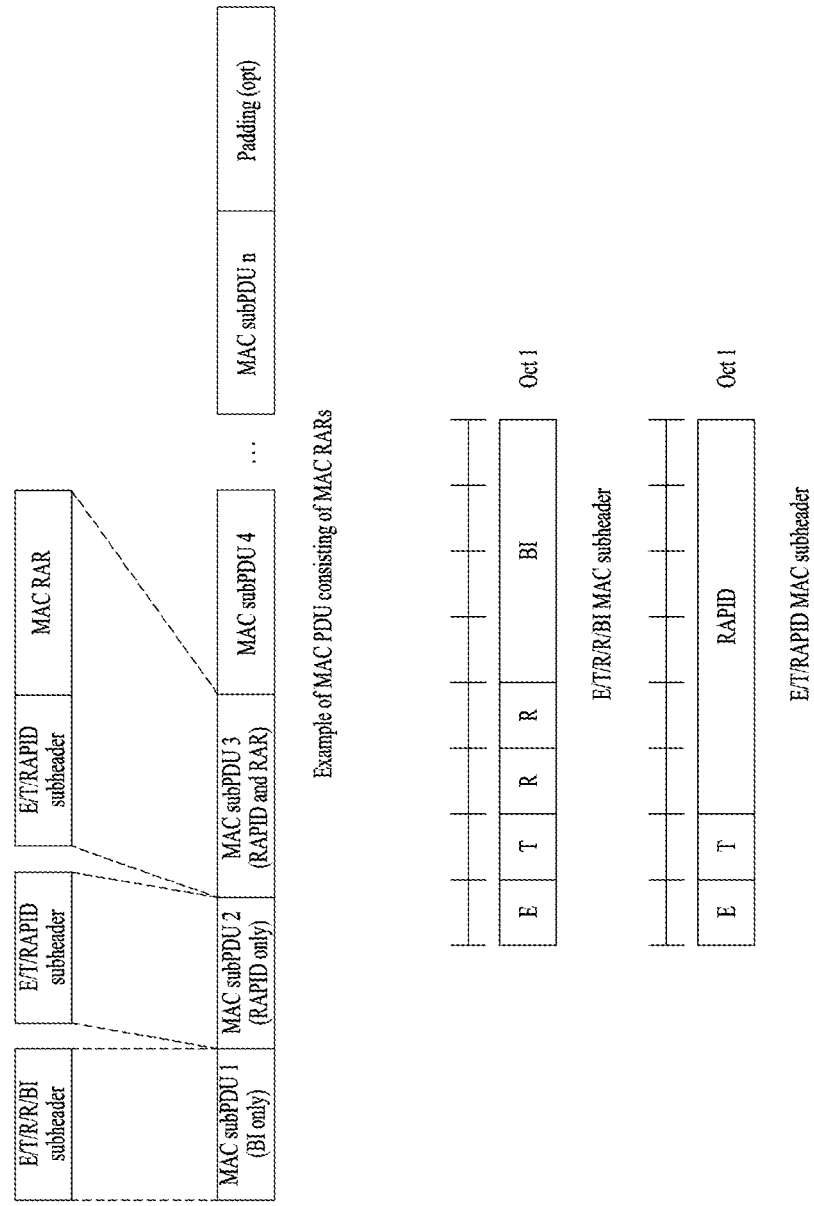
FIG. 12 illustrates a medium access control (MAC) random access response (RAR)

FIG. 12 illustrates the structure of a MAC protocol data unit (PDU) including an RAR.

Referring to FIG. 12, the MAC PDU includes one or more MAC subPDUs. The MAC subPDU may have one of the following structures.

- a structure consisting of only MAC subheaders including a back-off indicator (BI),
- a structure consisting of only MAC subheaders including a random access preamble index (RAPID) (e.g., a response to an SI request), and
- a structure consisting of MAC subheaders including the RAPID and of MAC RARs.

The MAC subheader including the BI includes E/T/R/R/BI fields. The MAC subheader having the RAPID includes E/T/RAPID fields. The E field indicates whether the MAC subheader is additionally present (1-bit), the T field indicates whether information included in the MAC subheader is the BI or the RAPID (1-bit), and the R field consists of reserved bits.

A MAC RAR may include a UL grant for Msg3, a temporary C-RNTI (TC-RNTI), and a timing advance (TA) command.

An existing 4-step RACH procedure may not be proper in a situation requiring fast channel access (e.g., URLLC) because the UE and the BS exchange a plurality of messages based on a collision situation. In a U-band situation, when the conventional 4-step RACH procedure is applied, the UE and the BS may alternate and may not sequentially succeed in performing UL/DL LBT (e.g., in relation to RAR/Msg3 scheduling/transmission). In this case, resource efficiency is degraded and access latency of the UE may increase.

Hereinafter, an RACH procedure providing fast channel access will be proposed. Specifically, the present disclosure proposes a 2-step RACH procedure including 1) transmission of a UL signal (e.g., a random access request message) (hereinafter, MsgA) from the UE to the BS and 2) a DL signal (e.g., a random access response message) (hereinafter, MsgB) from the BS to the UE. While an initial RACH procedure will mainly be described, a proposed method of the present disclosure may be equally/similarly applied even to an RACH procedure after RRC connection, without being limited to the initial RACH procedure. Further, while a U-band situation will mainly be described, the RACH procedure of the present disclosure may be applied even to an L-band. Hereinbelow, a plurality of CCs (indexes) may be replaced with a plurality of BWPs (or BWP indexes) configured in one (or more) CC(s) or (serving) cell(s) or with a plurality of CCs/cells consisting of a plurality of BWPs (i.e., a combination of a CC (index) and a BWP (index)).

Figure 13:
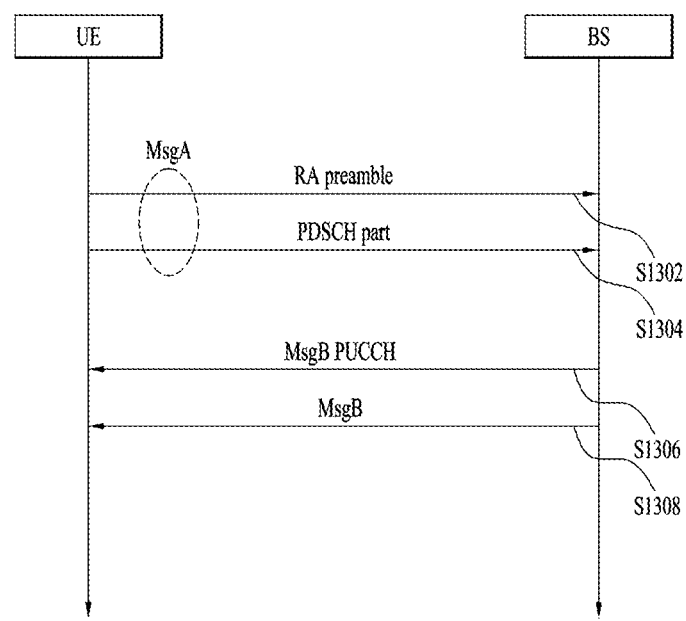
FIGS. 13 and 14 illustrate RACH procedures according to the present disclosure.

FIG. 13 illustrates a 2-step RACH procedure according to the present disclosure. Referring to FIG. 13, the UE may transmit a random access request message (e.g., MsgA) to the BS. MsgA transmission includes random access preamble (RAP) transmission (S1302) and PUSCH transmission (S1304). Next, in order to receive a response (i.e., MsgB) to MsgA, the UE may monitor a PDCCH in a time window related to the RAP. Specifically, in order to receive MsgB, the UE may receive the PDCCH that schedules MsgB (hereinafter, a MsgB PDCCH) in the time window (S1306) and receive MsgB based on the MsgB PDCCH (S1308). In order to receive the MsgB PDCCH, the UE may monitor a specific RNTI-based PDCCH (e.g., a CRC of the PDCCH is masked with a specific RNTI). Here, PDCCH monitoring includes blind-decoding a PDCCH candidate. The specific RNTI may include an RA-RNTI. Upon failing to successfully receive MsgB and/or failing to perform contention resolution, the UE may retransmit MsgA. If MsgB is received and contention resolution is successful, the RACH procedure is successfully ended. When MsgB includes PUCCH resource allocation information for HARQ-ACK feedback transmission, the UE may transmit HARQ-ACK feedback for MsgB reception using the allocated PUCCH resource. In addition, when MsgB includes a TA command and PUSCH resource allocation information (e.g., a UL grant), the UE may transmit a PUSCH based on the TA command and the PUSCH resource allocation information.

Hereinafter, an RACH transmission format configuration and a UE operation will be described in detail.

(1) MsgA Transmission Format and Parameter Configuration

The MsgA signal may be configured in a combination of an RACH preamble and a PUSCH part. The RACH preamble and the PUSCH part may be combined by, for example, TDM/FDM. Related parameters are defined as follows.

1) RACH preamble (or RA preamble)
   A. RACH occasion (RO): RO represents a time/frequency resource on which one RACH preamble signal may be transmitted.
   B. Preamble index (PI): PI represents an RACH preamble index that may be distinguished on a sequence in one RO. For example, when N RACH preambles are available in a cell, PI may be set to 0 to N-1. The RACH preamble may be configured with a Zadoff-Chu sequence but is not limited thereto. PI may be replaced with a RAPID.

2) PUSCH part
   A. Scrambling ID (SCID): SCID is a seed used for (data) scrambling of the PUSCH part. The SCID is used as a seed value for generating a scrambling sequence. The generated scrambling sequence is used to scramble data of the PUSCH part. The PUSCH part carries UE data (e.g., UL-SCH data) related to an RACH. For example, an RRC connection request, a buffer status report (BSR), and/or a contention resolution ID may be transmitted through the PUSCH part. The contention resolution ID may include a UE (global) ID and/or a CCCH SDU. For example, the UE (global) ID may include an international mobile subscriber identity (IMSI) and/or a C-RNTI.
   B. Demodulation RS (DMRS): DMRS is an RS used for demodulation of the PUSCH part. The DMRS may be distinguished by a sequence, a cyclic shift, an RE pattern/position, an orthogonal cover code (OCC), and/or an SCID.
   C. UL resource (ULRA): ULRA represents a UL (time/frequency) resource used to transmit the PUSCH part. The ULRA may be identified/distinguished by a ULRA (resource) index. A (resource) index may be divided into a time (resource) index and a frequency (resource) index.

Therefore, a MsgA signal/index may be configured (e.g., by TDM/FDM) in the form of combining (1) the RACH preamble based on a combination of {RO, PI} and (2) the PUSCH part based on a combination of {SCID+DMRS, ULRA}. The following options may be considered to configure MsgA.

1) Option 1
  A. One ULRA may be configured to correspond to one RO.
  B. A different combination of SCID+DMRS may correspond to each PI (with respect to a pair of {RO, ULRA}). To this end, the combination of SCID+DMRS may be determined based on a PI value. For example, the combination of SCID+DMRS may be determined based on a function value of the PI value.

2) Option 2
  A. A plurality of ULRAs may be configured to correspond to one RO.
  B. A different ULRA may correspond to each PI group (in one RO). For example, PIs in one RO are divided into a plurality of PI groups and a ULRA of a different frequency resource may correspond to each PI group. Alternatively, the ULRA may be determined based on the PI value (in the PI group). For example, the ULRA may be determined based on a function value of the PI (or PI MOD the number of PI groups) value. In addition, a ULRA frequency resource may be determined based on the PI group and a ULRA time resource may be determined based on the PI value (in the PI group).
  C. A different combination of SCID+DMRS may correspond to each PI (with respect to a pair of {PI group, ULRA}). To this end, the combination of SCID+DMRS may be determined based on the PI value (in the PI group). For example, the combination of SCID+DMRS may be determined based on the function value of the PI (or PI MOD the number of PI groups) value.

3) Related configuration and UE operation
  A. Pairing information of a combination of {RO, PI} for the RACH preamble and a combination of {SCID+DMRS, ULRA} for the PUSCH part corresponding to the combination of {RO, PI}, including the above options, may be pre-defined or may be broadcast through a PBCH/SIB.
  B. The UE may select 'the RACH preamble based on a specific combination of {RO, PI}' and select 'the PUSCH part based on a combination of {SCID+DMRS, ULRA} corresponding to the specific combination of {RO, PI}'. The UE may perform MsgA transmission in the form of combining/transmitting a finally selected RACH preamble and PUSCH part.
  C. The UE may transmit UE (global) ID information thereof (and/or BSR information) through 'the PUSCH part based on the combination of {SCID+DMRS, ULRA}'.

4) Additional considerations
  A. In Option 1 and/or Option 2, basically, one combination of SCID+DMRS or one combination of {SCID+DMRS, ULRA} corresponds to one PI. Alternatively, a plurality of combinations of SCID+DMRS or a plurality of combinations of {SCID+DMRS, ULRA} may be configured to correspond to one PI.
  B. In the latter, MsgB (or a PDSCH carrying MsgB) may indicate which of a plurality of combinations of SCID+DMRS or a plurality of combinations of {SCID+DMRS, ULRA}, linked to one specific PI, is the basis for an RACH response to PUSCH part transmission.
  C. A CP applied to the RACH preamble (hereinafter, RACH-CP) and a CP applied to an OFDM symbol constituting the PUSCH part (which are configured in the form of TDM) in MsgA may be configured as follows. 1) A CP length applied to all OFDM symbols in the PUSCH part may be configured to be equal to an RACH-CP length, or 2) A CP length applied to the first OFDM symbol in the PUSCH part may be configured to be equal to the RACH-CP length and a CP length applied to the remaining OFDM symbols in the PUSCH part may be configured to be smaller than the RACH-CP length. In 2), the CP length applied to the remaining OFDM symbols in the PUSCH part may be configured to be equal to a CP length applied to a normal PUSCH.
  D. For one MsgA, when a resource on which the RACH preamble is transmitted and a resource on which the PUSCH part corresponding thereto is transmitted are equal to each other or are separated from each other by an extent smaller than a specific level in the frequency domain, (since a PRACH preamble is usable as a DMRS for the PUSCH part,) the PUSCH part may be configured/transmitted without a corresponding DMRS.

The above SCID may be defined/configured in the form of being replaced with a TC-RNTI. For example, a PUSCH SCID may be derived/determined based on the TC-RNTI.

(2) MsgB Transmission Format and Content Configuration

A MsgB signal may differ in a transmission format and content configuration according to an indication/transmission type of RO information (by the BS to the UE). The following options may be considered to configure MsgB. Hereinafter, a PDCCH that schedules MsgB will be referred to as a MsgB PDCCH. A PDSCH that is scheduled by the MsgB PDCCH will be referred to as a MsgB PDSCH or PDSCH #1.

1) Option 1: Indication of RO information through RNTI of MsgB PDCCH (e.g., generation of RNTI based on RO. See Equation 1.)
  i. One or plural MsgBs may be included in (one) PDSCH scheduled from the MsgB PDCCH. Here, the MsgB may be configured with a MAC control element (CE) or a format similar thereto. In this case, information about to which PI value MsgB corresponds may be included in the MsgB PDSCH or each MsgB. For example, PI(s) may be included in the MsgB PDSCH or each MsgB.
  ii. In addition to UE (global) ID information (for contention resolution), a TA command, PUCCH resource information (for HARQ-ACK feedback transmission for MsgB reception), and/or RRC connection related information may be transmitted through MsgB.
  iii. Further, C-RNTI information to be used by the UE (and/or UE-specific search space (USS) configuration information for monitoring a C-RNTI-based UE-specific PDCCH) may be transmitted through MsgB. Here, the USS configuration information includes a time/frequency resource on which a USS may be configured/transmitted and/or period/slot information for performing a PDCCH monitoring (e.g., blind decoding) operation.

2) Option 2: Indication of RO information through RNTI of MsgB PDCCH
  i. One or more of DL grant information that schedules PDSCH #2 carrying an individual MsgB may be included in (one) PDSCH #1 scheduled from the MsgB PDCCH. In this case, information about to which PI value a DL grant for MsgB corresponds may be included in PDSCH #1. For example, PDSCH #1 may include at least one of a PI or a DL grant, and PDSCH #2 corresponding to PI may include an individual MsgB.
ii. Then, PDSCH #2 carrying a single MsgB corresponding to each PI value may be transmitted based on the DL grant information in PDSCH #1. Information included in MsgB may be configured in the same manner as in Option 1.
iii. Alternatively, a part of a UE (global) ID may be transmitted through PDSCH #1 and the other part of the UE ID may be transmitted through PDSCH #2 or MsgB.
iv. PDSCH #1 and PDSCH #2 may be transmitted in the form of TDM which is continuous in time. For example, PDSCH #2 may be continuously transmitted after PDSCH #1 in the time domain.
v. Another method
  1. One or more of DL grant information that schedules PDSCH #2 carrying MsgB for a PI group may be included in PDSCH #1. Information about to which PI group a DL grant for MsgB corresponds may be included in PDSCH #1.
  2. MsgB(s) corresponding to one or more PI values belonging to a PI group may be included in PDSCH #2. In this case, information about to which PI value MsgB corresponds may be included in PDSCH #2 or each MsgB.
3) Option 3: Indication of RO information through RNTI of MsgB PDCCH
  i. An individual MsgB corresponding to one specific PI value may be included in (one) PDSCH scheduled from the MsgB PDCCH. In this case, information about to which PI value MsgB transmission corresponds may be indicated through a specific field in the MsgB PDCCH.
  ii. Information included in MsgB may be configured in the same manner as in Option 1. MsgB may further include RRC connection related information.
  iii. PUCCH resource information for HARQ-ACK feedback transmission for MsgB reception may be indicated through the MsgB PDCCH.
  iv. Another method
    1. One or more MsgBs corresponding to one specific PI group may be included in (one) PDSCH scheduled from the MsgB PDCCH. In this case, information about to which PI group MsgB(s) correspond may be indicated through the specific field in the MsgB PDCCH.
    2. In this case, information about to which PI value in the PI group MsgBs correspond may be included in a PDSCH scheduled from the MsgB PDCCH or in each MsgB.
Option 4: Indication of RO information through specific field in MsgB PDCCH
  i. An RNTI used to transmit the MsgB PDCCH may be configured with respect to a PI value or an SCID value (used for the PUSCH part of MsgA). For example, the RNTI may be predefined (for each PI or SCID), may be broadcast through a PBCH/SIB, or may be determined as a function of the PI or SCID. The SCID value may be derived/determined based on the RNTI.
  ii. A (single) MsgB corresponding to a PI value linked to the RNTI value may be transmitted through the PDSCH scheduled from the MsgB PDCCH. Information included in MsgB may be configured as in Option 1. Additionally, the RRC connection related information may be further included in MsgB.
  iii. The PUCCH resource information for HARQ-ACK feedback transmission for MsgB reception may be indicated through the MsgB PDCCH.
  iv. Another method
    1. One or more MsgBs corresponding to one specific RO group may be included in (one) PDSCH scheduled from the MsgB PDCCH. In this case, information about to which RO group MsgB(s) correspond may be indicated through the specific field in the MsgB PDCCH.
    2. In this case, information about to which RO each MsgB corresponds may be included in the PDSCH or each MsgB.
5) Option 5: Indication of RO information through MsgB or through PDSCH carrying MsgB
  i. The RNTI used for MsgB PDCCH transmission may be configured in the same manner as in Option 4. One or more MsgBs may be included in (one) MsgB PDSCH scheduled from the MsgB PDCCH.
  ii. Information about to which RO MsgB(s) (in the MsgB PDSCH) correspond may be included in the PDSCH or each MsgB.
  iii. Information included in MsgB may be configured in the same manner as in Option 1.
6) Option 6: Indication of RO information through MsgB or through PDSCH carrying MsgB
  i. The RNTI used for MsgB PDCCH transmission may be configured as in Option 4. Specifically, one or more of DL grant information that schedules PDSCH #2 carrying an individual MsgB may be included in (one) PDSCH #1 scheduled from the MsgB PDCCH.
  ii. Information (DL grant information in PDSCH #1) about to which RO a DL grant for MsgB corresponds may be included in PDSCH #1.
  iii. Then, PDSCH #2 carrying a single MsgB corresponding to each RO may be transmitted based on each DL grant information in PDSCH #1. Information included in MsgB may be configured in the same manner as in Option 1.
  iv. Alternatively, a part of the UE (global) ID may be transmitted through PDSCH #1 and the remaining part of the UE (global) ID may be transmitted through PDSCH #2 or MsgB.
  v. PDSCH #1 and PDSCH #2 may be transmitted in the form of TDM which is continuous in time. For example, PDSCH #2 may be continuously transmitted after PDSCH #1 in the time domain.
  vi. Another method
    1. One or more of DL grant information that schedules PDSCH #2 may be transmitted through PDSCH #1. PDSCH #2 carries MsgB corresponding to each RO group. Information (DL grant information in PDSCH #1) about to which RO group a DL grant for MsgB corresponds may be included in PDSCH #1.
    2. MsgB(s) corresponding to one or more ROs belonging to one RO group may be included in PDSCH #2. Information about to which RO MsgB corresponds may be included in PDSCH #2 or each MsgB.
7) Option 7: Indication of combination of {RO, PI} through RNTI of MsgB PDCCH
  i. The RNTI used for MsgB PDCCH transmission may be configured with respect to each combination of {RO, PI} corresponding to MsgA. For example, the RNTI may be predefined (for each combination of {PO, PI}), may be broadcast through the PBCH/SIB, or may be determined as a function of a combination of {PO, PI}. The SCID value may be derived/determined based on the RNTI.
  ii. (Single) MsgB corresponding to a combination of {RO, PI} linked to the RNTI value may be transmitted through the PDSCH scheduled from the MsgB PDCCH. Information included in MsgB may be configured in the same manner as in Option 1. Additionally, the RRC connection related information may further be included in MsgB.

iii. The PUCCH resource information for HARQ-ACK feedback transmission for MsgB reception may be indicated through the MsgB PDCCH.

iv. Another method
1. One or more MsgB(s) corresponding to a combination of {RO, PI group}, a combination of {RO group, PI}, or a combination of {RO group, PI group} may be included in (one) PDSCH scheduled from the MsgB PDCCH. Information about a combination of {RO (group), PI (group)} may be indicated through the RNTI of the MsgB PDCCH. As an example, the RNTI of the MsgB PDCCH may be predefined/configured for each combination of {RO (group), PI (group)} or may be determined as a function of a corresponding combination.
2. Information about to which combination of {RO, PI} in {RO (group), PI (group)} corresponding to the RNTI MsgB corresponds may be included in the PDSCH or each MsgB.

8) Related UE operation
i. The UE may confirm whether a combination of {RO, PI} indicated through the MsgB PDCCH, the PDSCH scheduled from the MsgB PDCCH, and/or MsgB is equal to a combination of {RO, PI} corresponding to MsgA transmitted thereby.
ii. When a UE (global) ID included in MsgB is equal to an ID of the UE, the UE may operate to transmit HARQ-ACK (e.g., ACK) for MsgB reception by applying a received TA command and PUCCH resource information.
iii. The UE may perform an operation of monitoring and detecting the PDCCH/PDSCH scheduled therefor/transmitted thereto based on C-RNTI and PDCCH USS information included in MsgB or scrambling the PUSCH transmitted thereby.

Additionally, a search space (SS) for the MsgB PDCCH may be differently configured with respect to each RO (group) and/or each PI (group). As an example, a PDCCH monitoring occasion/slot for the MsgB PDCCH may be differently configured with respect to each RO (group) and/or each PI (group).

(3) MsgA Retransmission Signaling and UE Operation

In regard to a MsgA retransmission operation, related signaling and a UE operation may differ depending on whether 1) retransmission is performed in units of MsgA (i.e., including up to an RACH preamble) or 2) retransmission is performed only for a PUSCH part in MsgA. The following operations may be considered.

1) Case #1: Retransmission of entire MsgA including up to RACH preamble

A. Option 1
    i. MsgA retransmission may be scheduled through a specific PDCCH (hereinafter, MsgA_re PDCCH). For example, RO and/or PI information of MsgA to be used for MsgA retransmission may be scheduled through the MsgA_re PDCCH. Specifically, RO and PI information (predetected by the BS), which is to be retransmitted, may be indicated to the UE through an RNTI and a specific field of the MsgA_re PDCCH.
    ii. For example, 1) the RO information may be indicated through the RNTI of the MsgA_re PDCCH and a PI value may be indicated through the specific field in the MsgA_re PDCCH. In addition, 2) the RNTI of the MsgA_re PDCCH may be configured according to the PI value or an SCID value (used for the PUSCH part of MsgA) (and/or the SCID value may be derived/determined based on the RNTI), and the RO information may be indicated through the specific field in the MsgA_re PDCCH.
    iii. The MsgA_re PDCCH may be distinguished by a 1-bit flag in DCI while using the same RNTI as that of a MsgB PDCCH.
    iv. Another method
1. In this way, if the RO and PI information (predetected by the BS) is indicated to the UE, MsgA retransmission scheduling information may be automatically set to MsgA corresponding to an indicated combination of {RO, PI}.

B. Option 2
    i. Msg retransmission (e.g., the RO and/or PI information of MsgA to be used for retransmission) may be scheduled through a PDSCH corresponding to the MsgB PDCCH (hereinafter, PDSCH #1). The RO and/or PI information (predetected by the BS) to be retransmitted may be indicated through PDSCH #1 and/or the MsgB PDCCH (e.g., an RNTI and/or a field).
    ii. For example, 1) the RO information may be indicated through the RNTI of the MsgB PDCCH and the PI value may be indicated through the MsgB PDSCH. 2) The RNTI of the MsgB PDCCH may be configured according to the PI value or the SCID value (used for the PUSCH part of MsgA) (and/or the SCID value may be derived/determined based on the RNTI), and the RO information may be indicated through the MsgB PDSCH. 3) The RO information and the PI value may be indicated through a combination of the MsgB PDCCH and a specific field in the MsgB PDCCH.
    iii. The MsgA retransmission scheduling information in the PDSCH corresponding to the MsgB PDCCH (i.e., PDSCH #1) may be divided into DL grant information that schedules the PDSCH carrying MsgB (hereinafter, PDSCH #2) and a 1-bit flag. Therefore, the UE may interpret grant information in PDSCH #1 as the MsgA retransmission scheduling information or as DL grant information for PDSCH #2 reception according to the value of the 1-bit flag.
    iv. Another method
1. In this way, if the RO and PI information (predetected by the BS) is indicated by the UE, the MsgA retransmission scheduling information may be automatically set to MsgA corresponding to the indicated combination of {RO, PI}.

C. Power ramping and RACH counter
    i. For MsgA retransmission based on Case #1, the UE may increase MsgA transmit power and increase an RACH retransmission counter value. In this case, the UE may increase the whole transmit power of MsgA including the PUSCH part.
    ii. Alternatively, whether to increase or maintain the MsgA transmit power (and/or the RACH retransmission counter value) may be signaled through the PDCCH/PDSCH that schedules MsgA retransmission.

2) Case #2: Retransmission only for PUSCH part in MsgA
  A. Option 1
    i. MsgA retransmission (e.g., SCID+DMRS, UL grant information for the PUSCH, TA information, and/or transmit power control (TPC) command information) may be scheduled through a specific PDCCH (hereinafter, MsgA_re PDCCH). The RO and PI (or SCID) information (predetected by the BS) to be retransmitted may be indicated through the RNTI and the specific field of the MsgA_re PDCCH.
ii. For example, 1) the RO information may be indicated through the RNTI of the MsgA_re PDCCH and the PI (or SCID) value may be indicated through the specific field in the MsgA_re PDCCH. 2) The RNTI of the MsgA_re PDCCH may be configured according to the PI value or the SCID value (used for the PUSCH part of MsgA) (and/or the SCID value may be derived/determined based on the RNTI), and the RO information may be indicated through the specific field in the MsgA_re PDCCH.
iii. The MsgA_re PDCCH may be distinguished by the 1-bit flag in the DCI while using the same RNTI as that of the MsgB PDCCH. For example, whether content in the PDSCH corresponding to the PDCCH is MsgA retransmission scheduling information or MsgB (or DL grant information that schedules the MsgB PDSCH) may be indicated by the 1-bit DCI flag.
iv. Another method
 1. In this way, if the RO and PI information (predetected by the BS) is indicated to the UE, the MsgA retransmission scheduling information may be automatically set to the PUSCH part based on a combination of {SCID+DMRS, ULRA} corresponding to the indicated combination of {RO, PI}.
 2. Alternatively, in this way, if the RO and PI information (predetected by the BS) is indicated to the UE, the MsgA retransmission scheduling information may be determined based on a combination of SCID+DMRS corresponding to the indicated combination of {RO, PI} and the UL grant information for the PUSCH (and/or TA and/or TPC command information) signaled through the MsgA_re PDCCH.

B. Option 2
i. MsgA retransmission (e.g., SCID+DMRS, the UL grant information for the PUSCH, the TA information, and/or the TPC command information) may be scheduled through the PDSCH corresponding to the MsgB PDCCH (hereinafter, PDSCH #1). The RO and PI (or SCID) information (predetected by the BS) to be retransmitted may be indicated through PDSCH #1 and/or the MsgB PDCCH (e.g., an RNTI and/or a field).
ii. For example, 1) the RO information may be indicated through the RNTI of the MsgB PDCCH and the PI (or SCID) value may be indicated through PDSCH #1. 2) The RNTI of the MsgB PDCCH may be configured according to the PI value or the SCID value (used for the PUSCH part of MsgA) (and/or the SCID value may be derived/determined based on the RNTI), and the RI information may be indicated through PDSCH #1. 3) The RO information and the PI (or SCID) value may be indicated through a combination of the RNTI of the MsgB PDCCH and the specific field of the MsgB PDCCH.
iii. The MsgA retransmission scheduling information in PDSCH #1 may be divided into MsgB and a 1-bit flag in PDSCH #1 (e.g., in the case of Options 1/3/4/5/7 among the MsgB configuration options) or may be divided into DL grant information that schedules the PDSCH carrying MsgB (hereinafter, PDSCH #2) and a 1-bit flag (e.g., in the case of Options 2/6 among the MsgB configuration options). That is, in the former, whether content carried in PDSCH #1 is the MsgA retransmission scheduling information or MsgB may be indicated by the 1-bit flag. In the latter, whether content carried in PDSCH #1 is the MsgA retransmission scheduling information or the DL grant information that schedules PDSCH #2 carrying MsgB may be indicated by the 1-bit flag.
iv. Another method
 1. In this way, if the RO and PI information (predetected by the BS) is indicated by the UE, the MsgA retransmission scheduling information may be automatically set to the PUSCH part based on a combination of {SCID+DMRS, ULRA} corresponding to the indicated combination of {RO, PI}.
 2. Alternatively, in this way, if the RO and PI information (predetected by the BS) is indicated to the UE, the MsgA retransmission scheduling information may be determined based on a combination of SCID+DMRS corresponding to the indicated combination of {RO, PI} and UL grant information for the PUSCH (and/or TA and/or TPC command information) signaled through PDSCH #1.

C. Power ramping and RACH counter
i. In the case of MsgA retransmission based on Case #2, the UE may not increase the transmit power of the PUSCH part (automatically without a non-zero TPC command) and may not increase the RACH retransmission counter value.
ii. Alternatively, whether to increase or maintain the transmit power of the PUSCH part (and/or the RACH retransmission counter value) may be signaled through the PDCCH/PDSCH that schedules MsgA retransmission.

Whether 1) to retransmit the entire MsgA including up to the RACH preamble based on Case #1 or 2) to perform retransmission only for the PUSCH part in MsgA based on Case #2 may be signaled through a specific PDCCH in the case of Option 1 and through the PDSCH corresponding to the MsgB PDCCH in the case of Option 2.

(4) Operations of 2-Step RACH and 4-Step RACH
A method in which a 2-step RACH operation and a 4-step RACH operation are applied by combination or are selectively applied may be considered. Specifically, the following options may be considered.
 1) RACH procedure after RRC connection
 A. Contention-based (CB) RACH operation
  i. The UE may include a C-RNTI (and/or BSR information) (other than a UE (global) ID) in a PUSCH part of MsgA. After MsgA transmission, the UE may monitor (in an RAR window) Opt 1) a MsgB PDCCH and/or Opt 2) a PDCCH based on the C-RNTI thereof
   1. In Opt 1, the C-RNTI (other than UE (global) ID) may be included in MsgB. After confirming whether the C-RNTI included in MsgB is equal to a C-RNTI of the UE, the UE may transmit HARQ-ACK feedback for MsgB reception (by applying a TA command included in MsgB). Here, the MsgB PDCCH may be monitored based on an RA-RNTI.
   2. In Opt 2, upon detecting the C-RNTI-based PDCCH (regardless of a DCI format type (e.g., a DL or UL grant)) after MsgA transmission, the UE may recognize that contention resolution has been successful/has been ended. The TA command may be indicated through the PDCCH or through a PDSCH scheduled from the PDCCH. Success/end of contention resolution may be limitedly recognized only when the TA command is included in the C-RNTI-based PDCCH. When the TA command is not included in the C-RNTI-based PDCCH, since the C-RNTI-based PDCCH corresponds to a normal C-RNTI-based PDCCH, the UE may perform an operation based on control information of the detected PDCCH (e.g., operation of Opt 1). When contention resolution has been successful/has been ended, the UE may determine that an RACH procedure has been successfully ended. Then, the UE may stop an operation for receiving MsgB (e.g., operation of Opt 1).

ii. The above operation may be applied to both the case in which the UE performs a CB-RACH procedure for the purpose of transmitting UL SR information and the case in which the BS directly instructs the UE to perform the CB-RACH procedure by transmitting a PDCCH order signal.

B. Contention-free (CF) RACH operation i. The UE may include the C-RNTI (and/or BSR information) (other than the UE (global) ID) in the PUSCH part of MsgA. After MsgA transmission, the UE may monitor (in an RAR window) Opt 1) the MsgB PDCCH and/or Opt 2) the PDCCH based on the C-RNTI thereof.

1. In Opt 1, the C-RNTI (other than the UE (global) ID) may be included in MsgB or the C-RNTI (as well as the UE ID) may not be included in MsgB. The UE may confirm whether the C-RNTI included in MsgB is equal to the C-RNTI thereof and then transmit HARQ-ACK feedback for MsgB reception (by applying the TA command included in MsgB). Here, the MsgB PDCCH may be monitored based on the RA-RNTI.

2. In Opt 2, upon detecting the C-RNTI-based PDCCH (regardless of a DCI format type (e.g., a DL or UL grant)) after MsgA transmission, the UE may recognize that contention resolution has been successful/has been ended. The TA command may be indicated through the PDCCH or through the PDSCH scheduled from the PDCCH. Success/end of contention resolution may be limitedly recognized only when the TA command is included in the C-RNTI-based PDCCH. When the TA command is not included in the C-RNTI-based PDCCH, since the C-RNTI-based PDCCH corresponds to a normal C-RNTI-based PDCCH, the UE may perform an operation based on control information of the detected PDCCH (e.g., operation of Opt 1). When contention resolution has been successful/has been ended, the UE may determine that the RACH procedure has been successfully ended. Then, the UE may stop an operation for receiving MsgB (e.g., operation of Opt 1).

ii. Here, when the BS instructs the UE to perform the CF-RACH (or the CB-RACH) operation through a PDCCH order, information about a combination of {RO, PI} for MsgA to be transmitted by the UE (and a combination of {SCID+DMRS, ULRA} for the PUSCH part corresponding to the combination of {RO, PI}) may be signaled through the PDCCH order.

Figure 14:
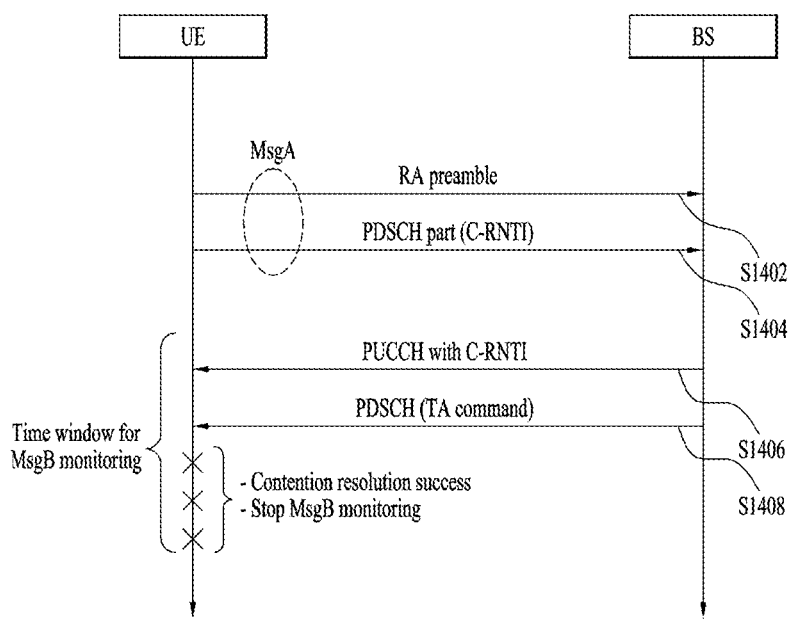

FIG. 14 illustrates an example of performing an RACH procedure according to the present disclosure. The example of FIG. 14 may be applied to a CB/CF RACH operation after RRC connection.

Referring to FIG. 14, the UE may transmit a random access request message (e.g., MsgA) to the BS. MsgA transmission includes RAP transmission (S1402) and PUSCH transmission (S1404). The RAP may be transmitted in one RO among a plurality of ROs and each RO may correspond to one or more PUSCH resources. Here, the RO may include a time-frequency resource used for RAP transmission and the PUSCH resource may include at least one of a PUSCH time-frequency resource, a PUSCH scrambling ID, or a PUSCH DMRS resource. Then, PUSCH transmission (S1404) may be performed using a resource related to RAP transmission (S1402). MsgA transmission may be performed in an RRC connection state and the PUSCH (S1404) may include a C-RNTI of the UE. Next, for MsgB reception, the UE may monitor a PDCCH in a time window related to the RAP. Specifically, for MsgB reception, the UE may monitor a specific RNTI-based PDCCH (e.g., a CRC of the PDCCH is masked with a specific RNTI) in the time window. The specific RNTI may include an RA-RNTI. In addition, the UE may monitor the PDCCH to check whether there is a C-RNTI-based PDCCH of S1404 (e.g., CRC of the PDCCH is masked with a C-RNTI) in the time window. In this case, the C-RNTI-based PDCCH may be detected (S1406) and a TA command may be included in a PDSCH indicated by the PDCCH of step S1406 (S1408). In this case, the UE may determine that contention resolution is successful and may end the RACH procedure. Thus, the UE may end a PDCCH monitoring procedure for MsgB reception in the remaining time window even though no MsgB is received. For example, the UE may stop monitoring the PDCCH for checking whether the RA-RNTI-based PDCCH is present.

Depending on whether the TA command is present, the UE may determine whether the C-RNTI-based PDCCH in the time window is a response to MsgA or indicates a normal PDCCH. For example, upon receiving the C-RNTI-based PDCCH without the TA command, the UE may continue to perform the PDCCH monitoring procedure for receiving MsgB in the remaining time window. The TA command may also be received through the PDCCH of step S1406 unlike the example shown in the drawing. In this case, step S1408 may be omitted.

In the example of FIG. 14, the TA command may be received through the PDCCH. In this case, PDSCH reception in S1408 may be omitted. As an example in which the TA command is received through the PDCCH, a method may be considered in which, if a plurality of bits constituting an RA field in the C-RNTI-based PDCCH (DCI) indicates invalid resource allocation (e.g., if all RA field bits indicate '1' in a state in which a resource indication value (MV) resource allocation scheme (of an RB or RBG unit) is indicated or if all RA field bits indicate '0' in a state in which a bit map resource allocation scheme (of an RB or RBG unit) is indicated), the UE performs an operation in a state in which the UE regards/interprets such resource allocation indication as indication of the TA command through the PDCCH (DCI) (without PDSCH scheduling). In this case, the TA command may be indicated through the remaining field (e.g., an MC S/transport block size (TBS), a HARQ process ID, and/or a new data indicator (NDI)/redundancy version (RV)) in the DCI. The UE may perform an operation of feeding back/transmitting an ACK response to DCI reception by applying an ACK/NACK (A/N) transmission timing and an A/N PUCCH resource indicated through an A/N timing indication field and an A/N PUCCH resource allocation field. In contrast, if valid resource allocation is indicated through the RA field in the C-RNTI-based PDCCH (DCI), the UE may perform an operation in a state in which the UE regards/interprets the PDCCH (DCI) as a normal PDCCH (for scheduling PDSCH transmission).

In the above description, the same method may be applied when the PDCCH (DCI) is replaced with UL grant PDCCH (DCI).

2) Selection of 2-step RACH procedure and 4-step RACH procedure

A. Selection of RACH procedure according to TBS value/range to be transmitted by UE
  i. A TBS value/range transmittable through MsgA (i.e., the PUSCH part in MsgA) of the 2-step RACH and a TBS value/range transmittable through Msg3 of the 4-step RACH may be differently defined/configured. That is, which format of MsgA of the 2-step RACH and Msg3 of the 4-step RACH is based for transmission with respect to each TBS value/range may be defined/configured. Corresponding information may be predefined or may be broadcast through a PBCH/SIB.
  ii. Accordingly, the UE may select an RACH procedure through which a TBS preferred thereby is transmittable and perform an operation of transmitting MsgA or Msg1 according to the selected RACH procedure. Next, TBS information may be indicated through a PDCCH/PDSCH that schedules UL retransmission. If a corresponding TBS value is a value transmittable only through a Y-step RACH other than an X-step RACH that the UE has first selected (e.g., {X=2, Y=4} or {X=4, Y=2}), the UE may perform an operation of transmitting a TBS based on a UL transmission format of the Y-step RACH.
  iii. Additionally, when the number of times of Msg3 retransmission in the 4-step RACH procedure exceeds a specific value R (refer to FIG. 11), the UE may transition to the 2-step RACH procedure. Then, the UE may perform MsgA transmission. The R value may be predefined or may be broadcast through the PBCH/SIB.
  iv. Alternatively, when the number of times of MsgA retransmission (or the PUSCH part included in MsgA) in the 2-step RACH procedure exceeds the specific value R, the UE may transition to the 4-step RACH procedure (refer to FIG. 11). Accordingly, the UE may perform Msg1 transmission. The R value may be predefined or may be broadcast through the PBCH/SIB.

B. 2-step RACH operation according to TBS value/range to be transmitted by UE
  i. A TBS value/range transmittable through MsgA (i.e., the PUSCH part in MsgA) of the 2-step RACH may be differently defined/configured according to each PI (group), each RO (group), or each combination of {PI, RO}. Corresponding information may be predefined or may be broadcast through the PBCH/SIB. That is, which of a PI (group), an RO (group), and a combination of {PI, RO} is based for MsgA transmission may be defined/configured for each TBS value/range. The UE may select a PI/RO configured for/corresponding to TBS transmission preferred thereby and transmit MsgA corresponding to/configured for the selected PPRO.
  ii. Additionally, a resource allocated to the PUSCH part of MsgA may be differently defined/configured for each TBS value/range (and/or PUSCH part (re)transmission) transmittable through MsgA. Corresponding information may be predefined or may be broadcast through the PBCH/SIB. As an example, more frequency resources (e.g., RBs) may be allocated to the PUSCH part of MsgA configured for/corresponding to transmission of a larger TBS (when the number of time resources (e.g., symbols) is equal) or more time resources (e.g., symbols) may be allocated to transmission of a larger TBS (when the number of frequency resources (e.g., RBs) is equal). As another example, more frequency resources (e.g., RBs) may be allocated to (m+k)-th (k>0) PUSCH part retransmission relative to m-th PUSCH part transmission (when the number of time resources (e.g., symbols) is equal) or more time resources (e.g., symbols) may be allocated to (m+k)-th (k>0) PUSCH part retransmission relative to m-th PUSCH part transmission (when the number of frequency resources (e.g., RBs) is equal).
  iii. Additionally, when the number of times of MsgA (e.g., the PUSCH part in MsgA) retransmission corresponding to a specific TBS in the 2-step RACH procedure exceeds the specific value R, the TBS may be changed to a smaller TBS and corresponding MsgA transmission may be performed. The R value may be predefined or may be broadcast through the PBCH/SIB.

C. Selection of RACH procedure considering transmit power of UE
  i. The UE may select any operation of the 2-step RACH and the 4-step RACH according to measured reference signal received power (RSRP), path loss, and/or a required transmit power level based thereon. Specifically, transmission of the PUSCH part included in MsgA in the 2-step RACH procedure has a high probability of requiring many resources relative to transmission of the PUSCH carrying Msg3 in the 4-step RACH procedure. Then, PUSCH transmit power levels accompanied in the 2-step RACH and the 4-step RACH may be different, or a maximum transmit power of the UE may be insufficient with respect to a specific X-step RACH. Therefore, the UE may select one of the two RACHs according to a PUSCH transmit power that the BS desires to receive and/or a PUSCH transmit power necessary for path loss compensation in the UE. The above description may be applied as a condition for determining switching between MsgA transmission of the 2-step RACH and Msg1 transmission of the 4-step RACH and/or a condition for determining switching between MsgA transmission of the 2-step RACH and Msg3 transmission of the 4-step RACH.

D. Selection of RACH procedure based on U-band channel and LBT operation
  i. The UE may select one RACH procedure of the 2-step RACH and the 4-step RACH based on an LBT result/statistic for a U-band wireless channel. As an example, the UE may select one of the two RACH procedures according to whether a U-band channel state based on LBT is a (statistically) idle/busy level (e.g., whether an idle/busy possibility is above Y % or under Y % or whether an idle-busy ratio is above Z or under Z). The Y value and/or Z value may be predefined or may be broadcast through the PBCH/SIB.
  ii. Alternatively, a maximum retransmission counter value A for MsgA or a maximum failure counter value B for LBT may be defined/configured separately from a maximum retransmission counter value for Msg1 of the 4-step RACH. As an example, when the number of times of MsgA (re)transmission exceeds A, the UE may transition to the 4-step RACH procedure (i.e., Msg1 transmission is performed. Refer to FIG. 11). Alternatively, when the number of times of LBT failure (e.g., busy) exceeds B with respect to first UL transmission (e.g., Msg1 or MsgA) of an X-step RACH, the UE may transition to a Y-step RACH procedure (e.g., {X=2, Y=4} or {X=4, Y=2}). The value of A and/or B may be predefined or may be broadcast through the PBCH/SIB.
  iii. Alternatively, an LBT type of (first) UL transmission (e.g., Msg1 or MsgA) of the 2-step RACH and the 4-step RACH may be differently defined/configured. As an example, the UE may attempt to use two LBT types and select an RACH procedure including a UL transmission format to which a successful LBT type is set.

3) Switching between 2-step RACH procedure and 4-step RACH procedure

A. Retransmission of PUSCH part of MsgA with Msg3 type/format i. Retransmission of the PUSCH part may be indicated, through the PDCCH/PDSCH that schedules retransmission of the PUSCH part of MsgA, to be performed by switching to the Msg3 type/format. In this case, a TC-RNTI may be included in the PDCCH/PDSCH.

ii. Then, the UE may perform scrambling for the Msg3 PUSCH (scheduled through the PDCCH/PDSCH) based on the TC-RNTI. In this case, for contention resolution for Msg3 transmission, MsgB may be transmitted (in this case, the UE monitors the MsgB PDCCH) or Msg4 may be transmitted (in this case, the UE monitors a TC-RNTI-based PDCCH).

iii. When the MsgB format is transmitted for contention resolution, additional C-RNTI information may not be included in MsgB. Instead, the UE may use the TC-RNTI as a C-RNTI.

B. Power ramping and RACH counter during switching between RACH procedures i. When an X-step RACH switches to an Y-step RACH (e.g., {X=2, Y=4} or {X=4, Y=2}), first-Msg transmit power of the Y-step RACH (as compared with recent first-Msg transmit power in a previous X-step RACH) may not be increased.

ii. When the X-step RACH switches to the Y-step RACH (e.g., {X=2, Y=4} or {X=4, Y=2}), 1) an RACH retransmission counter value may be increased or 2) the RACH retransmission counter value may be maintained without increase.

iii. Alternatively, whether to increase or maintain the first-Msg transmit power of the Y-step RACH (and/or the RACH retransmission counter value) (relative to recent first-Msg transmit power in a previous X-step RACH (and/or the RACH retransmission counter value)) may be signaled through the PDCCH/PDSCH that triggers switching to the Y-step RACH.

4) Sharing of PRACH transmission resource between RACH procedures

A. A transmission resource may be configured based on the following options with respect to an RACH preamble constituting MsgA in the 2-step RACH (hereinafter, 2-step RP) and an RACH preamble corresponding to Msg1 in the 4-step RACH (hereinafter, 4-step RP).

i. Opt 1: Different PI values may be set between the 2-step RP and the 4-step RP (in one RO) in a state in which the same RO is configured between the 2-step RP and the 4-step RP. That is, the 2-step RP and the 4-step RP may share an RO and may be distinguished by a PI value.

ii. Opt 2: Different RO values may be set between the 2-step RP and the 4-step RP in a state in which the same PI value (set) is configured between the 2-step RP and the 4-step RP (to be shared). That is, the 2-step RP and the 4-step RP may share the PI and may be distinguished by the RO.

iii. Opt 3: Both the RO value and the PI value may be differently set between the 2-step RP and the 4-step RP.

iv. Opt 4: Which scheme of Opt 1/2/3 (or Opt 1/2, Opt 1/3, or Opt 2/3) is applied (and which RO/PI configuration information is applied) may be broadcast through the PBCH/SIB.

B. In Opt 1, when an RO-based RNTI is generated, MsgB of the 2-step RACH (simply, MsgB) and the PDCCH that schedules an RAR of the 4-step RACH (simply, RAR) may not be distinguished only by the RNTI. Accordingly, a method of distinguishing between MsgB and the RAR is needed. To this end, the following options may be considered.

i. Opt 1: Both the 2-step MsgB and the 4-step RAR may be included in the PDSCH scheduled from an RNTI-based PDCCH (determined according to the RO). In this case, considering that a legacy UE understands/applies only a 4-step RACH format and an advanced UE understands/applies both the 4-step RACH format and a 2-step RACH format, the RAR may be mapped first within the PDSCH (payload) (e.g., to a lower/faster bit index part) and then MsgB may be mapped.

ii. Opt 2: Which of MsgB and the RAR is included in a corresponding PDSCH may be indicated through (i) an RNTI of a PDCCH that schedules MsgB or the RAR or (ii) a 1-bit flag in the PDCCH. In the former, the RNTI may be determined based on the RO and the RACH type. For example, Equation 1 may be changed as follows.

$$\text{RA-RNTI}=1+s\_id+14\times t\_id+14*80*f\_id+14*80*8*ul\_carrier\_id+14*80*8*2*rach\_step \quad \text{[Equation 2]}$$

where rach_step may be 0 for the 4-step RACH and 1 for the 2-step RACH.

iii. Opt 3: A DCI payload size of the PDCCH that schedules MsgB and a DCI payload size of the PDCCH that schedules the RAR may be differently configured.

In the present disclosure, PUCCH resource allocation through MsgB (or through the PDCCH that schedules MsgB) and HARQ-ACK feedback transmission for MsgB reception (through a corresponding PUCCH resource) may be applied by being replaced with PUSCH resource allocation through MsgB (or the PDCCH that schedules MsgB) and a corresponding PUSCH transmission operation (that applies a TA command).

Figure 15:
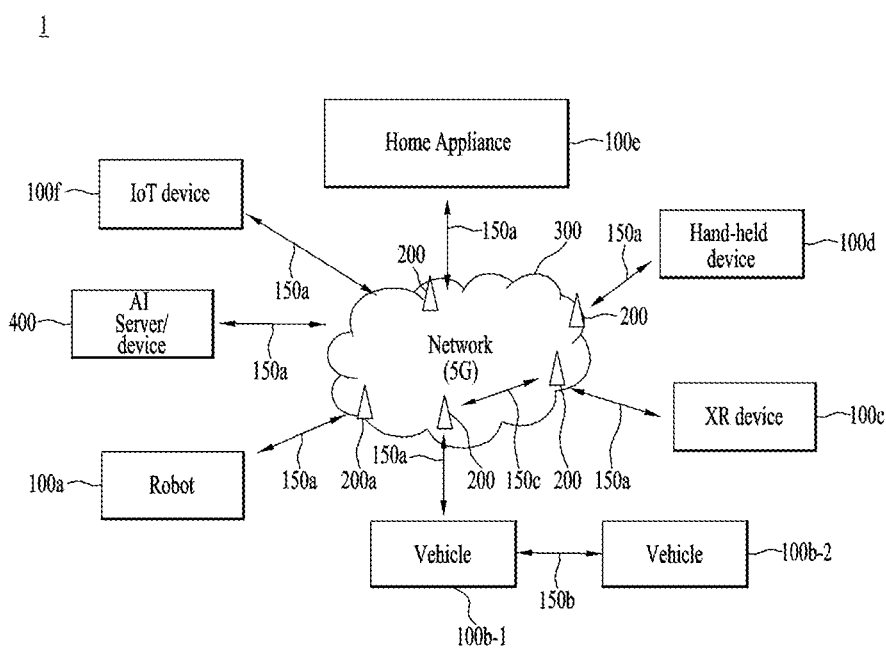
FIGS. 15 to 18 communication systems and wireless devices applied to the present disclosure.

FIG. 15 illustrates a communication system 1 applied to the present disclosure.

Referring to FIG. 15, a communication system 1 applied to the present disclosure includes wireless devices, Base Stations (B Ss), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous driving vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the B Ss 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 16:
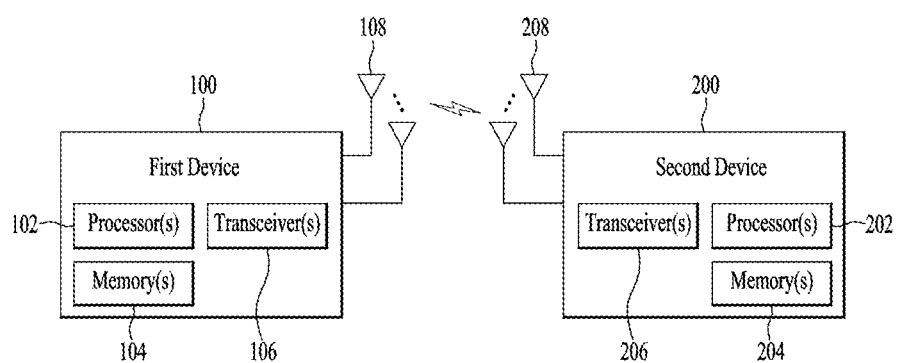

FIG. 16 illustrates wireless devices applicable to the present disclosure.

Referring to FIG. 16, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 15.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 17:
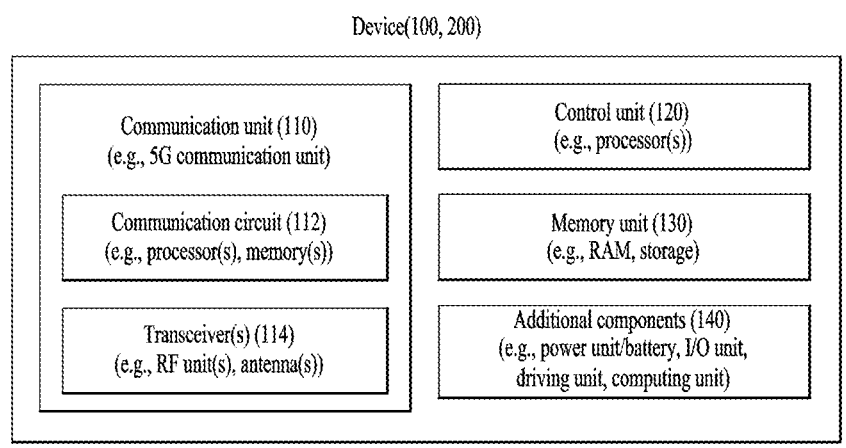

FIG. 17 illustrates another example of a wireless device applied to the present disclosure. The wireless device may be implemented in various forms according to a use-case/service (refer to FIG. 15).

Referring to FIG. 17, wireless devices 100 and 200 may correspond to the wireless devices 100 and 200 of FIG. 16 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 16. For example, the transceiver(s) 114 may include the one or more transceivers 106 and 206 and/or the one or more antennas 108 and 208 of FIG. 16. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 15), the vehicles (100b-1 and 100b-2 of FIG. 15), the XR device (100c of FIG. 15), the hand-held device (100d of FIG. 15), the home appliance (100e of FIG. 15), the IoT device (100f of FIG. 15), a digital broadcast terminal, a hologram device, a public safety device, an MTC device, a medicine device, a fintech device (or a finance device), a security device, a climate/environment device, the AI server/device (400 of FIG. 15), the BSs (200 of FIG. 15), a network node, etc. The wireless device may be used in a mobile or fixed place according to a use-example/service.

In FIG. 17, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Figure 18:
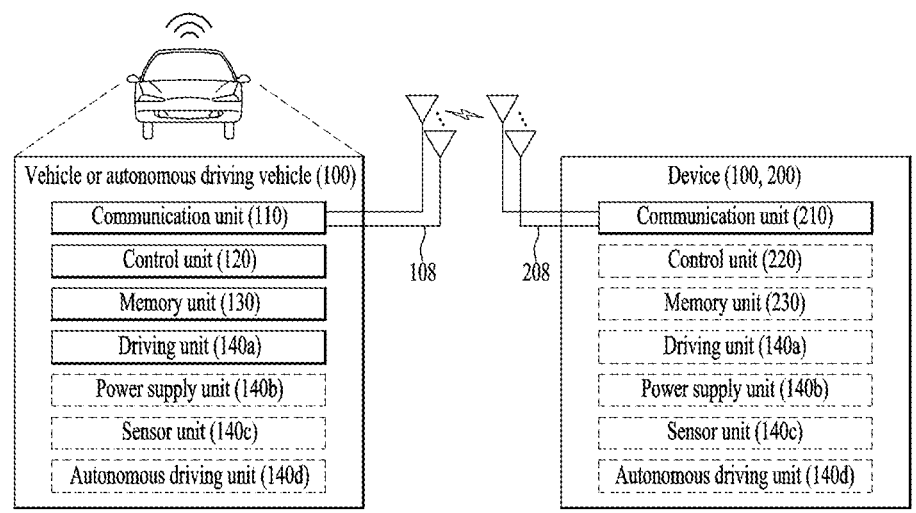

FIG. 18 illustrates a vehicle or an autonomous driving vehicle applied to the present disclosure. The vehicle or autonomous driving vehicle may be implemented by a mobile robot, a car, a train, a manned/unmanned Aerial Vehicle (AV), a ship, etc.

Referring to FIG. 18, a vehicle or autonomous driving vehicle 100 may include an antenna unit 108, a communication unit 110, a control unit 120, a driving unit 140*a*, a power supply unit 140*b*, a sensor unit 140*c*, and an autonomous driving unit 140*d*. The antenna unit 108 may be configured as a part of the communication unit 110. The blocks 110/130/140*a* to 140*d* correspond to the blocks 110/130/140 of FIG. 17, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an Electronic Control Unit (ECU). The driving unit 140*a* may cause the vehicle or the autonomous driving vehicle 100 to drive on a road. The driving unit 140*a* may include an engine, a motor, a powertrain, a wheel, a brake, a steering device, etc. The power supply unit 140*b* may supply power to the vehicle or the autonomous driving vehicle 100 and include a wired/wireless charging circuit, a battery, etc. The sensor unit 140*c* may acquire a vehicle state, ambient environment information, user information, etc. The sensor unit 140*c* may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140*d* may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140*d* may generate an autonomous driving path and a driving plan from the obtained data. The control unit 120 may control the driving unit 140*a* such that the vehicle or the autonomous driving vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140*c* may obtain a vehicle state and/or surrounding environment information. The autonomous driving unit 140*d* may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous driving vehicles and provide the predicted traffic information data to the vehicles or the autonomous driving vehicles.

The above-described embodiments correspond to combinations of elements and features of the present disclosure in prescribed forms. And, the respective elements or features may be considered as selective unless they are explicitly mentioned. Each of the elements or features can be implemented in a form failing to be combined with other elements or features. Moreover, it is able to implement an embodiment of the present disclosure by combining elements and/or features together in part. A sequence of operations explained for each embodiment of the present disclosure can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

INDUSTRIAL APPLICABILITY

The present disclosure is applicable to UEs, eNBs or other apparatuses of a wireless mobile communication system. system.

What is claimed is:

1. A method for performing a random access (RA) procedure by a user equipment (UE) in a wireless communication system, the method comprising:
   receiving a downlink reference signal in a downlink bandwidth part (DL BWP);
   performing a measurement based on the received downlink reference signal;

based on the measurement, performing a 2-step RA procedure in an uplink (UL) BWP;
based on the 2-step RA procedure being initiated, transmitting a message A (msgA) including both a RA preamble and a physical uplink shared channel (PUSCH), wherein a cell-radio network temporary identifier (C-RNTI) is included in the msgA;
receiving a physical downlink control channel (PDCCH) for scheduling a physical downlink shared channel (PDSCH); and
receiving the PDSCH based on the PDCCH,
wherein, based on the PDCCH for the C-RNTI and based on the PDSCH including a timing advanced (TA) command, the UE considers the RA procedure as successfully completed.

2. The method of claim 1, wherein the measurement includes Reference Signal Received Power (RSRP).

3. The method of claim 1, wherein, based on a level of the measurement, the 2-step RA procedure is performed among the 2-step RA procedure and a 4-step RA procedure.

4. The method of claim 1, wherein, in the 2-step RA procedure, a transmission of the RA preamble is performed in an RA occasion (RO) among a plurality of ROs, and a resource for the PUSCH is determined in association with the RA.

5. The method of claim 4, wherein the RO includes a time-frequency resource used for the transmission of the RA preamble, and the resource for the PUSCH includes at least a time-frequency resource, a scrambling identity (ID) or a demodulation reference signal (DMRS) resource.

6. The method of claim 1, further comprising:
transmitting a second msgA including both a second RA preamble and a second PUSCH for a second RA procedure;
receiving a second PDCCH for scheduling a second PDSCH including a msgB;
receiving the msgB based on the second PDCCH,
wherein, based on the msgB, the UE considers the second RA procedure as successfully completed, and
wherein the msgB includes a UE contention resolution identity, a physical uplink control channel (PUCCH) resource indicator for hybrid automatic repeat and request (HARQ-ACK) feedback for the msgB, a second TA command, and a second C-RNTI.

7. The method of claim 6, further comprising:
transmitting a third msgA including both a third RA preamble and a third PUSCH for a third RA procedure;
receiving a third PDCCH for scheduling a third PDSCH including a second msgB;
receiving the second msgB based on the third PDCCH; and
transmitting a fourth PUSCH for the third RA procedure based on the second msgB including a RA preamble identity, a third TA command, and an uplink grant for the fourth PUSCH.

8. The method of claim 7, wherein whether a received msgB is the second msgB or not is identified based on a 1-bit flag in the received msgB.

9. A user equipment (UE) configured to perform a random access (RA) procedure in a wireless communication system, the UE comprising:
at least one radio frequency (RF) module;
at least one processor; and
at least one computer memory operably connectable to the at least one processor and storing instructions that, when executed, cause the at least one processor to perform operations comprising:
receiving a downlink reference signal in a downlink bandwidth part (DL BWP);
performing a measurement based on the received downlink reference signal;
based on the measurement, performing a 2-step RA procedure in an uplink (UL) BWP;
based on the 2-step RA procedure being initiated, transmitting a message A (msgA) including both a RA preamble and a physical uplink shared channel (PUSCH), wherein a cell-radio network temporary identifier (C-RNTI) is included in the msgA;
receiving a physical downlink control channel (PDCCH) for scheduling a physical downlink shared channel (PDSCH); and
receiving the PDSCH based on the PDCCH,
wherein, based on the PDCCH for the C-RNTI and based on the PDSCH including a timing advanced (TA) command, the UE considers the RA procedure as successfully completed.

10. The UE of claim 9, wherein the measurement includes Reference Signal Received Power (RSRP).

11. The UE of claim 9, wherein, based on a level of the measurement result, the 2-step RA procedure is performed among the 2-step RA procedure and a 4-step RA procedure.

12. The UE of claim 9, wherein, in the 2-step RA procedure, a transmission of the RA preamble is performed in an RA occasion (RO) among a plurality of ROs, and a resource for the PUSCH is determined in association with the RA.

13. The UE of claim 12, wherein the RO includes a time-frequency resource used for the transmission of the RA preamble, and the resource for the PUSCH includes at least a time-frequency resource, a scrambling identity (ID) or a demodulation reference signal (DMRS) resource.

14. A device for a user equipment (UE) to perform a random access (RA) procedure in a wireless communication system, the device comprising:
at least one processor; and
at least one computer memory operably connectable to the at least one processor and storing instructions that, when executed, cause the at least one processor to perform operations comprising:
receiving a downlink reference signal in a downlink bandwidth part (DL BWP);
performing a measurement based on the received downlink reference signal;
based on the measurement, performing a 2-step RA procedure in an uplink (UL) BWP;
based on the 2-step RA procedure being initiated, transmitting a message A (msgA) including both a RA preamble and a physical uplink shared channel (PUSCH), wherein a cell-radio network temporary identifier (C-RNTI) is included in the msgA;
receiving a physical downlink control channel (PDCCH) for scheduling a physical downlink shared channel (PDSCH); and
receiving the PDSCH based on the PDCCH,
wherein, based on the PDCCH for the C-RNTI and based on the PDSCH including a timing advanced (TA) command, the UE considers the RA procedure as successfully completed.

15. The device of claim 14, wherein the measurement includes Reference Signal Received Power (RSRP).

16. The device of claim 14, wherein, based on a level of the measurement result, the 2-step RA procedure is performed among the 2-step RA procedure and a 4-step RA procedure.

17. The device of claim 14, wherein, in the 2-step RA procedure, a transmission of the RA preamble is performed in an RA occasion (RO) among a plurality of ROs, and a resource for the PUSCH is determined in association with the RA.

18. The device of claim 17, wherein the RO includes a time-frequency resource used for the transmission of the RA preamble, and the resource for the PUSCH includes at least a time-frequency resource, a scrambling identity (ID) or a demodulation reference signal (DMRS) resource.

* * * * *